United States Patent
Kohno et al.

(10) Patent No.: US 9,435,923 B2
(45) Date of Patent: Sep. 6, 2016

(54) INFRARED SHIELDING FILM

(75) Inventors: Junichi Kohno, Hachioji (JP);
Takahiko Nojima, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 417 days.

(21) Appl. No.: 14/118,722

(22) PCT Filed: May 17, 2012

(86) PCT No.: PCT/JP2012/062697
§ 371 (c)(1),
(2), (4) Date: Nov. 19, 2013

(87) PCT Pub. No.: WO2012/161096
PCT Pub. Date: Nov. 29, 2012

(65) Prior Publication Data
US 2015/0132550 A1    May 14, 2015

(30) Foreign Application Priority Data

May 20, 2011  (JP) ................. 2011-113260
May 20, 2011  (JP) ................. 2011-113261
Jun. 2, 2011   (JP) ................. 2011-124487

(51) Int. Cl.
*G02B 5/26*   (2006.01)
*G02B 1/04*   (2006.01)
*G02B 5/20*   (2006.01)

(52) U.S. Cl.
CPC . *G02B 5/26* (2013.01); *G02B 1/04* (2013.01); *G02B 5/206* (2013.01); *G02B 5/208* (2013.01); *Y10T 428/24942* (2015.01)

(58) Field of Classification Search
None
See application file for complete search history.

(56) References Cited

U.S. PATENT DOCUMENTS

2010/0208349 A1 * 8/2010 Beer .............. G02B 1/04
                                        359/580

FOREIGN PATENT DOCUMENTS

| CN | 101501533    |   | 8/2009  |          |
|----|--------------|---|---------|----------|
| JP | 08-110401 A  |   | 4/1996  |          |
| JP | 2003-266577 A|   | 9/2003  |          |
| JP | 2004-123766 A|   | 4/2004  |          |
| JP | 2009-086659 A|   | 4/2009  |          |
| JP | 2009-544491 A|   | 12/2009 |          |
| JP | 2012242500 A | * | 12/2012 | G02B 5/26|

OTHER PUBLICATIONS

[Machine Translation to English] Takamuki; JP 2012-242500 A (Pub. Dec. 10, 2012).*
International Search Report of PCT/JP2012/062697 dated Aug. 21, 2012.
Japanese IPRP, International Application No. PCT/JP2012/062697, International filing date May 17, 2012. Date issuance Nov. 20, 2013 (5 pages).
English translation of Japanese IPRP, International Application No. PCT/JP2012/062697, International filing date May 17, 2012. Date of issuance Nov. 20, 2013 (6 pages).
Office Action dated Apr. 14, 2015 from the corresponding Chinese Patent Application No. 201280024554.4.
English translation of the Office Action dated Apr. 14, 2015 from the corresponding Chinese Patent Application No. 201280024554.4.

* cited by examiner

*Primary Examiner* — David Sample
*Assistant Examiner* — Donald M Flores, Jr.
(74) *Attorney, Agent, or Firm* — Lucas & Mercanti, LLP

(57) ABSTRACT

An infrared shielding film has at least one unit on a substrate, the unit having a low refractive index layer that contains first metal oxide particles and a first binder and a high refractive index layer that is arranged adjacent to the low refractive index layer, contains second metal oxide particles and a second binder, and has a higher refractive index than the low refractive index layer, in which at least one layer of the low refractive index layer and the high refractive index layer contains, as a binder, at least one of the following (a) to (c):

(a) a carboxyvinyl polymer that contains a monomer component, which contains a carboxylic acid, in an amount of 20 to 75% by mass of the entire composition,
(b) a copolymer having pH dependency of viscosity, and
(c) a modified polyvinyl alcohol.

19 Claims, No Drawings

INFRARED SHIELDING FILM

CROSS REFERENCE TO RELATED APPLICATION

This Application is a 371 of PCT/JP2012/062697 filed on May 17, 2012, which claims the priority of Japanese Patent Application No. 2011-113260 filed on May 20, 2011, Japanese Patent Application No. 2011-113261 filed on May 20, 2011, and Japanese Patent Application No. 2011-124487 filed on Jun. 2, 2011, all applications are incorporated herein by reference in their entirety.

TECHNICAL FIELD

The present invention relates to an infrared shielding film.

BACKGROUND ART

In recent years, due to the growing interest in energy saving, there is a high demand for an infrared shielding film which shields transmission of heat rays of sunlight by being installed in the windowpane of the buildings or the vehicles from a viewpoint of reducing the load applied to air conditioning facilities.

Light emitted from the sun has a broad spectrum covering from the ultraviolet region to the infrared region. Visible light has the wavelength range of 380 to 780 nm from violet, yellow, to red light, and it accounts for about 45% of the sunlight. With regard to infrared rays, those close to the visible light are referred to as near infrared rays (wavelength of 780 to 2500 nm) and those above the range are referred to as intermediate infrared rays, and they account for about 50% of the sunlight. Although the intensity of the light energy in the range is about less than 1/10 of ultraviolet rays, it has a strong thermal action, and thus when absorbed by a material, it is released as heat to cause temperature increase. From this point of view, it is also referred to as heat rays. By shielding those rays, room temperature increase can be suppressed. It is also possible to suppress dissipation of heating energy to outside the room during the winter in a cold area.

Mainly, a dry film forming method such as a vapor deposition method or a sputtering method, has been proposed as the method of producing an infrared shielding film in which laminate films are formed by laminating the high refractive index layer and a low refractive index layer by turns. However, since the dry film forming method needs a large size vacuum equipment for the forming, there are problems, for example, that it requires high manufacture cost so that it is difficult to form a film with a large area, and the substrate is limited to a heat resistant material.

Instead of the dry film forming method having the problems like above, a method of forming an infrared shielding film by a wet coating method is known.

For example, a method, of forming a transparent laminate using a coating liquid for a high refractive index layer in onion a thermocurable silicone resin or a UV curable acryl resin containing microparticles of a metal oxide or a metal compound is dispersed in an organic solvent and coating it on a substrate according to a wet coating method using a bar coater is known (for example, see Patent Literature 1).

Further, a method of forming a transparent laminate by coating a composition for forming a high refractive index coating film which consists of rutile type titanium dioxide, a heterocycle-based nitrogen compound, (e.g., pyridine), a UV curable binder, and an organic solvent on a substrate according to a wet coating method using a bar coater is disclosed (for example, see Patent Literature 2).

Meanwhile, as a method of forming a layer containing titanium dioxide particles, for example, a method of laminating by turns using a slurry containing particles of spherical rutile type titanium dioxide dispersed in methanol and methanol silica sol is known (for example, see Patent Literature 3).

CITATION LIST

Patent Literature

Patent Literature 1: JP 8-110401 A
Patent Literature 2: JP 2004-123766 A
Patent Literature 3: JP 2003-266577 A

SUMMARY OF INVENTION

Technical Problem

However, according to a method for forming an infrared shielding film including application of the methods disclosed in Patent Literature 1 and Patent Literature 2 or the method disclosed in Patent Literature 3 and forming a layer containing metal oxide particles by using a wet coating method, there are problems that, for example, an infrared shielding film obtained has high haze, desired infrared reflecting property or visible light transmittance cannot be obtained, and as non-uniform optical characteristics are shown, uniformity of visibility is insufficient.

With regard to the problem described above, the inventors of the present invention suggest an infrared shielding film having art excellent infrared shielding effect, which is produced by a simultaneous multilayer coating of a unit having a low refractive index layer that contains first metal oxide particles and a water based binder and a high refractive index layer that is adjacent to the low refractive index layer, and contains second metal oxide particles and a water based binder. However, under the present circumstances in which strict shielding performance against infrared rays from sunlight and a uniform optical performance are required to have higher energy saving characteristics, an improvement of the technology is required more than ever.

The present invention is devised in view of the problems described above, and the object of the present invention is to provide an infrared shielding film that can be produced at low cost and provided as a film with a large area, and has an excellent infrared reflecting property, high visible light transmittance, and excellent uniformity of optical characteristics.

Solution to Problem

The aforementioned object of the present invention is achieved by the following constitution.

1. An infrared shielding film including on a substrate at least one unit having a low refractive index layer that contains first metal oxide particles and a first binder and a high refractive index layer that is adjacent to the low refractive index layer, contains second metal oxide particles and a second binder, and has a higher refractive index than the low refractive index layer, in which at least one layer of the low refractive index layer and the high refractive index layer contains, as a binder, at least one of the following (a) to (c):

(a) a carboxyvinyl polymer that contains a monomer component, which contains a carboxylic acid, in an amount of 20 to 75% by mass of the entire composition;
(b) a copolymer having pH dependency of viscosity; and
(c) a modified polyvinyl alcohol.

2. The infrared shielding film according to 1 described above, wherein at least one layer of the low refractive index layer and the high refractive index layer contains (c) the modified polyvinyl alcohol.

3. The infrared shielding film according to 2 described above, wherein the modified polyvinyl alcohol is a copolymer obtained by copolymerization of (1) a polyvinyl alcohol having an average polymerization degree of 200 to 2400 and (2) one, or two or more types of polymerizable vinyl monomer selected from a group consisting of unsaturated carboxylic acid, a salt thereof, and an ester thereof, at mass ratio of 0.5:9.5 to 9.5:0.5.

4. The infrared shielding film according to 3 described above, wherein the polymerizable vinyl monomer is one, or two or more types selected from a group consisting of acrylic acid, methacrylic acid, fumaric acid, maleic acid, itaconic acid, and a salt thereof, and an unsaturated carboxylic acid ester represented by the following formula (I):

[Chem. 1]

$$CH_2=C(R_1)-COOR_2 \quad (I)$$

In the formula, $R_1$ represents a hydrogen atom or a methyl group and $R_2$ represents an alkyl group with 1 to 4 carbon atoms.

5. The infrared shielding film according to 4 described above, wherein the polymerizable vinyl monomer is a mixture of acrylic acid or a salt thereof and methyl methacrylate, and the mass ratio of acrylic acid or a salt thereof to methyl methacrylate is 3:7 to 0.5:9.5 (acrylic acid or a salt thereof: methyl methacrylate).

6. The infrared shielding film according to any one of 2 to 5 described above, wherein a content of the modified polyvinyl alcohol is 5 to 45% by mass with respect to the total binder amount of a layer containing the modified polyvinyl alcohol.

7. The infrared shielding film according to 1 described above, wherein at least one layer of the low refractive index layer and the high refractive index layer contains (a) the carboxyvinyl polymer that contains a monomer component, which contains a carboxylic acid, in an amount of 20 to 75% by mass of the entire composition.

8. The infrared shielding film according to 7 described above, wherein a content of the carboxyvinyl polymer is 0.2 to 5.0% by mass with respect to the total binder amount of a layer containing the carboxyvinyl polymer.

9. The infrared shielding film according to 1 described above, wherein at least one layer of the low refractive index layer and the high refractive index layer contains (b) the copolymer having pH dependency of viscosity.

10. The infrared shielding film according to 9 described above, wherein the copolymer having pH dependency of viscosity is a copolymer consisting of at least a monomer having vinyl amide and a monomer having vinyl carboxylic acid.

11. The infrared shielding film according to 10 described above, wherein the vinyl amide is at least one monomer selected from vinyl pyrrolidone, vinyl caprolactam, N-vinyl formamide, N-vinyl acetamide, N-vinyl-N-methylacetamide, and a mixture thereof.

12. The infrared shielding film according to 10 or 11 described above, wherein the vinyl carboxylic acid is at least one monomer selected from (metha)acrylic acid, crotonic acid, itaconic acid, maleic acid, and a mixture thereof.

13. The infrared shielding film according to any one of 9 to 12 described above, wherein the copolymer having pH dependency of viscosity is a copolymer which is polymerized using a cross linking agent having at least two polymerizable free radical groups in the molecule.

14. The infrared shielding film according to 13 described above, wherein the cross linking agent is at least one compound selected from pentaerythritol triallyl ether, pentaerythritol triacrylate, pentaerythritol tetraacrylate, and methylene bisacrylamide.

15. The infrared shielding film according to any one of 9 to 14 described above, wherein a content of the copolymer having pH dependency of viscosity is 0.2 to 4.0% by mass with respect to the total binder amount of a layer containing the copolymer.

16. The infrared shielding film according to any one 1 to 15 described above, wherein the low refractive index layer has pores.

Effect of the Present Invention

According to the present invention, an infrared shielding film that can be produced at low cost and provided as a film with a large area, and has an excellent infrared reflecting property, high visible light transmittance, and excellent uniformity of optical characteristics is provided.

DESCRIPTION OF EMBODIMENTS

Hereinbelow, embodiments for carrying out the present invention are explained in detail.

According to one embodiment or the present invention, an infrared shielding film having on a substrate at least one unit having a low refractive index layer that contains first metal oxide particles and a first binder and a high refractive index layer that is adjacent to the low refractive index layer, contains second metal oxide particles and a second binder, and has a higher refractive index than the low refractive index layer is provided. It is also characterized in that at least one layer of the low refractive index layer and the high refractive index layer contains, as a binder, at least one of the following (a) to (c):
(a) a carboxyvinyl polymer that contains a monomer component, which contains a carboxylic acid, in an amount of 20 to 75% by mass of the entire composition;
(b) a copolymer having pH dependency of viscosity; and
(c) a modified polyvinyl alcohol.

As for the reason why if is possible to achieve fine desired effect of the present invention by the aforementioned constitutions defined by the present invention, it is presumed as follows.

In other words, it was found in the present invention that, by containing at least one of the above (a) to (c) in a coating liquid for forming a low refractive index layer that contains first metal oxide particles and a first binder and a high refractive index layer that is adjacent to the low refractive index layer, contains second metal oxide particles and a second binder, and has a higher refractive index than the low refractive index layer, the viscosity of the coating liquid that is required for stably performing the simultaneous multilayer coating with a constitution of having a relatively thin wet film thickness can be achieved by addition of a small amount, and as a result, abnormality on film surface or in film thickness of a multilayer film which is caused by disturbances in each layer during a coating-drying step can be reduced, a high content of each of the first metal oxide particles and the second metal oxide particles with respect to the binder, which is required to achieve desired refractive index or difference in refractive index of the low refractive index layer and the high refractive index layer, can be easily achieved, and reduction in visible light transmittance or infrared shielding (reflecting) rector that is believed to be caused by interlayer mixing of a binder or metal oxide particles during the coating-drying can be lowered, and the present invention was achieved accordingly.

Further, although the reason for the effect of improving interlayer mixing, which causes migration of the first metal oxide particles contained in the first binder or the low refractive index layer and the second metal oxide particles contained in the second binder of the higher refractive index layer after the coating-drying to solidification, cannot be analyzed in detail because it is a phenomenon occurring in multilayer of thin film, it is believed that, when the first metal oxide as silicon dioxide (silica) and the second metal oxide is titanium oxide, the titanium oxide particles in the high refractive index layer, which are the second metal oxide migrate to the adjacent low refractive index layer, and as a result, the difference in refractive index between two layers becomes smaller than expected, and thus an occurrence of reduction in the aforementioned infrared shielding (reflecting) factor cannot be prevented, however, by containing a pre-determined polymer of the present invention, it becomes possible to stably maintain the desired viscosity of a coating liquid for the high refractive index layer so that excellent infrared shielding (reflecting) factor is obtained.

Hereinbelow, constitutional elements of the infrared shielding film of the present invention and embodiments for carrying out the present invention are explained in detail.

[Infrared Shielding Film]

The infrared shielding film of the present invention has at least one unit consisting of a substrate, a high refractive index layer, and a low refractive index layer.

For an infrared shielding film, it is generally preferable to design to have a large difference in refractive index between the high refractive index layer and the low refractive index layer from the viewpoint that the infrared reflectance can be increased with a small number of layers. According to the present embodiment, in at least one unit consisting of the high refractive index layer and the low refractive index layer, the difference in refractive index between the adjacent high refractive index layer and the low refractive index layer is preferably 0.1 or higher, more preferably 0.3 or higher, still more preferably 0.35 or higher, and particularly preferably 0.4 or higher. When the infrared shielding film has plural units of the high refractive index layer and the low refractive index layer, it is preferable that the difference in refractive index between the high refractive index layer and the low refractive index layer is within the above preferred range for all units, with the proviso that, the outermost layer or the lowermost layer may have a constitution that they are not within the preferred range described above. Further, in the infrared shielding film according to the present embodiment, refractive index of the high refractive index layer is preferably 1.80 to 2.50, and more preferably 1.90 to 2.20. Further, refractive index of low high refractive index layer is preferably 1.10 to 1.60, and more preferably 1.30 to 1.50

Reflectance in specific wavelength range is determined by a difference in refractive index between adjacent two layers and lamination number. The larger the difference in refractive index is, the smaller the layer number is required to obtain the same reflectance. The difference in refractive index and required layer number can be calculated by using a commercially available software for optical design. For example, to obtain infrared reflectance of 90% or higher, lamination of 200 layers or more is needed if the difference in refractive index is smaller than 0.1, which yields not only lower productivity but also lower transparency due to higher scattering at lamination interface, and it becomes also very difficult to perform production without failures. From the viewpoint of improving the reflectance and decreasing the layer number, the difference in refractive index is substantially limited to 1.4 or so, although there is no upper limit in refractive index.

Moreover, with regard to the optical characteristics of the infrared shielding film of the present invention, it is preferable to have a transmittance of the visible light described in JIS R3106-1998 of 50% or more, preferably 75% or more and more preferably 85% or more and also preferable to have a region with a reflectance of 50% or more at a wavelength of 900 to 1,400 nm.

Next, explanations of the basic summary of constitutions of the high refractive index layer and the low refractive index layer of the infrared shielding film of the present invention are given.

If the infrared shielding film according to the present embodiment has a constitution in which it has at least one unit consisting of a high refractive index layer and a low refractive index layer on a substrate. From the viewpoint of the above, preferable layer number of the high refractive index layer and the low refractive index layer is 100 layers or less as a total layer number, i.e., 50 units or less. More preferably, it is 40 layers (20 units) or less, and still more preferably 20 layers (10 units) or less.

A total thickness of the infrared shielding film according to the present embodiment is preferably 12 to 315 μm, more preferably 15 to 200 μm, and still more preferably 20 to 100 μm. Further, thickness per single layer of the low refractive index layer is preferably 20 to 800 nm, and more preferably 50 to 350 nm. Meanwhile, thickness per single layer of the high refractive index layer is preferably 20 to 800 nm, and more preferably 50 to 350 nm.

[Substrate]

The substrate used for the infrared shielding film according to the present embodiment is not particularly limited, if it is formed with a transparent or organic material.

Examples of the substrate include a film composed of a resin such as methacrylic acid ester, polyethylene terephthalate (PET), polyethylene naphthalate (PEN), polycarbonate (PC), polyarylate, polystyrene (PS), aromatic a polyamide, polyether ether ketone, polysulfone, polyether sulfone, polyimide, or polyether imide, and a resin film obtained by laminating two or more layers of those resins. From the viewpoint of cost and easy obtainability, polyethylene terephthalate (PET), polyethylene naphthalate (PEN), polycarbonate (PC), or the like are preferably used.

The thickness of the substrate is preferably 5 to 200 μm and more preferably 15 to 150 μm.

Further, the substrate preferably has a transmittance of a visible light region described in JIS R3106-1998 of 85% or more, and particularly preferably 90% or more. By having the substrate with the same or greater transmission than above, it is advantageous in that the transmittance of a visible light region described in JIS R3106-1998 is 50% or more when it is prepared as an infrared shielding film, and thus if is preferable.

Further, the substrate using the above resin or the like may be either a non-stretched film or a stretched film. From the viewpoint of improving strength and inhibiting thermal expansion, a stretched film is preferable.

The substrate can be produced by a known general method in the related art. For example, by melting a resin as a material using an extruder and extruding it using an annular die or a T die followed by rapid cooling, a non-stretched substrate which is substantially amorphous and not oriented can be produced. Further, a stretched substrate can be produced by stretching a non-stretched substrate in a flow (vertical axis) direction of the substrate or a direction perpendicular (horizontal axis) to the flow direction of the substrate by a known method such as monoaxial stretching, tenter type successive biaxial stretching, tenter type simultaneous biaxial stretching, or tubular type simultaneous biaxial stretching. For such case, the stretching ratio can be suitably selected in accordance with the resin as a raw material of the substrate. However, it is preferably 2 to 10 times, in vertical axis direction and horizontal axis direction, respectively.

Further, from the viewpoint of size stability, the substrate may be subjected to a relaxing treatment or an off-line heating treatment. After thermal fixing of the polyester film during stretching and film forming process, the relaxing treatment is preferably performed during a step within a tenter for horizontal stretching or winding after exit from the tenter. The relaxing treatment is preferably performed at the treatment temperature of 80 to 200° C. More preferably, the treatment temperature is 100 to 180° C. It is preferably performed in the range in which a relaxing rate is 0.1 to 10% both in length direction and in width direction. More preferably, the treatment is performed with a relaxing rate of 2 to 6%. The substrate after relaxing treatment has favorable size stability as well as improved heat resistance as a result of performing an off-line heating treatment which is described below.

A coating liquid for under coating layer is preferably in-line coated on one surface or both surfaces of the substrate during film forming process. In the present invention, coating an under coating during film forming process is referred to as in-line under coating. Examples of the resin used for the coating liquid for under coating layer, which is useful in the present invention, include a polyester resin, an acryl modified polyester resin, a polyurethane resin, an acryl resin, a vinyl resin, a vinylidene chloride resin, a polyethylene imine vinylidene resin, a polyethyleneimine resin, a polyvinyl alcohol resin, a modified polyvinyl alcohol resin, and gelatin, and all of them can be preferably used. The undercoating layer may be added with known additives of the related art. Further, the undercoating layer may be coated by a publicly known method such as a roll coating, a gravure coating, a knife coating, a dip coating, and a spray coating. A coating amount of the under coating layer is preferably about 0.01 to 2 g/m² (in dry state).

[Metal Oxide Particles]

Examples of the metal oxide particles which can be used for the infrared shielding film according to the present embodiment include titanium dioxide, zirconium oxide, zinc oxide, synthetic amorphous silica, colloidal silica, alumina, colloidal alumina, lead titanate, minium, chrome yellow, zinc sulfide, chromium oxide, ferric oxide, iron black, copper oxide, magnesium oxide, magnesium hydroxide, strontium titanate, yttrium oxide, niobium oxide, europium oxide, lanthanum oxide, zircon, and tin oxide.

In order to form a high refractive index layer which is transparent and has a higher refractive index, the high refractive index layer preferably contains metal oxide particles having a high refractive index each as titanium or zirconia, i.e., titanium oxide particles or zirconium oxide particles. In particular, it is preferable to contain rutile type (tetragonal type) titanium oxide particles with a volume average particle diameter or 100 nm or less.

The volume average particle diameter of titanium oxide particles or zirconium oxide particles that are used in the present invention is preferably 100 nm or less, and more preferably 4 to 50 nm. Still more preferably, it is 4 to 40 nm. It is preferable when the volume average particle diameter is 100 nm or less, less haze is caused and the visible light transmission is excellent.

The volume average particle diameter described herein means the volume average particle diameter of the primary particles or the secondary particles dispersed in a medium, and it can be measurers by a laser diffraction/scattering method, or a dynamic light scattering method, for example.

Specifically, the particles themselves or the particles exposed on a cross-section or a surface of the refractive index layer are observed under an electron microscope, particle diameters of any 1,000 particles are measured, and when the volume per single particle is vi in a group of the metal oxide particles in which particles having a particle diameter of d1, d2, ... di, ..., dk, are present in the number of n1, n2, ..., ni, ..., nk, respectively, the average particle diameter weighted with the volume represented as, a volume average particle diameter $mv=\{\Sigma(vi \cdot di)\}/[\Sigma(vi)]$, is calculated.

Further, titanium oxide particles or zirconium oxide particles that are used in the present invention are preferably mono-dispersed. As described herein, "mono-dispersed" indicates that the mono-dispersity obtained by the following equation is 40% or less. The mono-dispersity is more preferably 30% or less, and particularly preferably 0.1 to 20%.

Monodispersity=(Standard deviation of particle diameter)/(Average value of particle diameter)×100     [Equation 1]

As for the titanium oxide particles used in the present invention, it is preferable to use those obtained by hydrophobicizing the surface of water based titanium oxide sol, which has a pH of 1.0 to 3.0 and includes titanium particles with a positive zeta potential, to have it in an organic solvent-dispersible state.

As for the method for producing the water based titanium oxide sol which may be used in the present invention, references can be made to the descriptions included in JP 63-17221A, JP 7-819A, JP 9-165218A, JP 11-43327 A, JP 63-17221 A, JP 7-819 A, JP 9-165218 A, and JP 11-43327 A.

Other examples of the method of producing the titanium oxide particles used in the present invention may be referred to p 255-258 (2000) in "Titanium oxide-physical properties and applied technology" by Manabu SEINO, published by Gihodo Shuppan Co., Ltd., or Method in Process (2) described at paragraph 0011 to 0023 of WO2007/039993.

The production method by the above process (2) includes a process (1) of treating a titanium dioxide hydrate with at least one kind of basic compounds selected from a group consisting of the hydroxide of an alkali metal and the hydroxide of an alkaline earth metal, and thereafter a process (2) of treating the obtained titanium dioxide dispersion with a carboxylic acid group-containing compound and an inorganic acid. In the present invention, the water based sol of the titanium oxide with a pH of 1.0 to 3.0 adjusted with the inorganic acid, which is obtained by the process (2), can be used.

A content of the metal oxide particles (preferably, titanium oxide particles) in the high refractive index layer is preferably 15 to 70% by mass, more preferably 20 to 65% by mass, and still more preferably 30 to 60% by mass with respect to 100% by mass of the solid content of the high refractive index layer.

Meanwhile, as for the metal oxide particles contained in the low refractive index layer, silicon dioxide is preferably used, and a synthetic amorphous silica and colloidal silica can be mentioned. Among them, it is preferable to use acidic colloidal silica sol. It is more preferable to use colloidal silica sol dispersed in an organic solvent. In addition, to further lower the refractive index, it is particularly preferable to use hollow fine particles having pores inside the particle as the metal oxide particles. Hollow fine particles of silicon dioxide (silica) are most preferable.

The average particle diameter of the metal oxide particles (preferably silicon dioxide) contained in the low refractive index layer is preferably 3 to 100 nm. The average particle diameter of the primary particles of silicon dioxide dispersed in the state of the primary particle (particle size in a dispersion liquid state before coating) is more preferably 3 to 50 nm, still more preferably 3 to 40 nm, particularly preferably 3 to 20 nm, and most preferably 4 to 10 nm. Moreover, the average particle diameter of the secondary particles is preferably 30 nm or less, from the viewpoint of excellent visible light transmission as having less haze.

The average particle diameter of the metal oxide particles that are used in the low refractive index layer of the present invention is measured by observing the particles themselves or the particles exposed on a cross-section or a surface of the refractive index layer under an electron microscope, measuring particle diameters of any 1,000 particles, and obtaining the simple average value thereof (number average value). Herein, the particle diameter of each particle represents a diameter of a circle assumed to be the same as the reflected area.

The colloidal silica used in the present invention is obtained by heating and aging of silica sol that is obtained by metathesis reaction with an acid or the like or by passing through an ion exchange resin layer of sodium silicate, and it is described, for example, in JP 57-14091 A, JP 60-219083 A, JP 60-219084 A, JP 61-20792 A, JP 61-188183 A, JP 63-17807 A, JP 4-93284 A, JP 5-278324 A, JP 6-92011 A, JP 6-183134 A, JP 6-297830 A, JP 7-81214 A, JP 7-101142 A, JP 7-179029 A, JP 7-137431 A, or WO 94/26530 A or the like.

As for the colloidal silica, a synthesized product may be used or a commercially available product may be used.

The surface of the colloidal silica may be cation-modified or treated with Al, Ca, Hg, or Ba.

The hollow fine particles used in the present invention preferably has an average particle pore diameter of 3 to 70 nm. It is more preferably 5 to 50 nm, and still more preferably 5 to 45 nm. Meanwhile, the average particle pore diameter of the hollow fine particles means the average value of inner diameter of the hollow fine particles. In the present invention, when the average particle pore diameter of the hollow fine particles is within the above range, the refractive index of the low refractive index layer can be easily have a sufficiently low refractive index. The average particle pore diameter is obtained by observing randomly 50 or more pore diameters of a circle, an oval, or a substantially circle or oval under an electron microscope to obtain a pore diameter of each particle and obtaining the number average value of them. Meanwhile, in the description, the average particle pore diameter means the minimum distance among the distances between two parallel lines tangent to the outlines of the diameter of a pore, which is observed as a circle, an oval, or a substantially circle or oval.

An average thickness of the outer shell of the hollow fine particles that are used in the present invention is preferably 10 nm or less, more preferably 1 to 7 nm, and still more preferably 1 to 5 nm. Meanwhile, as described herein, the outer side of the pore of the hollow fine particles is referred to as an outer shell. When the thickness of the outer shell is 10 nm or less, haze is small and the infrared shielding film has excellent light transmittance, and therefore it is preferable. When the thickness of the outer shell is 1 nm or more, mechanical strength of the particles is enhanced, and thus the particles can maintain the shape in the low refractive index layer. As a result, it is easy to form pores. The average thickness of the outer shell is obtained by observing randomly 50 or more average thickness of an outer shell of a pre which is observed as a circle, an oval, or a substantially circle or oval under an electron microscope to obtain average the thickness of the outer shell for each particle and obtaining the number average of them.

As for the hollow fine particles, a synthesized product may be used or a commercially available product may be used. For the hollow fine particles of silicon dioxide (silica), an organic silicon compound (e.g., alkoxysilane such as tetraethoxylsilane or the like) is added to an aqueous dispersion of calcium carbonate under alkali condition (e.g., ammonia is added) followed by stirring. After that, it is heated to 50 to 80° C. and stirred to obtain a dispersion of silica-coated calcium carbonate. Calcium carbonate in the dispersion of silica-coated calcium carbonate is dissociated under acidic condition (e.g., acetic acid is added) to elute calcium carbonate with generation of carbonate gas. After adding distilled water to the obtained dispersion, the dispersion is subjected to ultrafiltration until distilled water is discharged in the same amount as the added amount. By performing the ultrafiltration one to five times, a dispersion containing silica hollow fine particles can be obtained.

A content of the metal oxide particles in the low refractive index layer is preferably 0.1 to 50% by mass, more preferably 0.5 to 45% by mass, still more preferably 1 to 40% by mass, and particularly preferably 5 to 30% by mass with respect to 100% by mass of the solid contents of the low refractive index layer.

[Binder]

In the infrared shielding film according to the present embodiment, each of the high refractive index layer and the low refractive index layer contains the first binder and the second binder. Further, it is characterized in that at least one of the high refractive index layer and the low refractive index layer contains, as a binder, at least one of the following (a) to (c):
  (a) a carboxyvinyl polymer that contains a monomer component, which contains a carboxylic acid, in an amount of 20 to 75% by mass of the entire composition;
  (b) a copolymer having pH dependency of viscosity; and
  (c) a modified polyvinyl alcohol.

According to the present invention, the binder is contained in each layer of the high refractive index layer and the low refractive index layer. A content of the binder in each refractive index layer is preferably in the range of 5.0% by mass to 50% by mass with respect to 100% by mass of the total mass of the refractive index layer. More preferably, it is in the range of 5.0% by mass to 45% by mass, still more preferably 10% by mass to 40% by mass, and particularly preferably 25% by mass to 35% by mass. When the binder is little, a tendency of having deteriorated transparency due to disturbance of film surface increases during drying after coating of the refractive index layer. However, when the content is 50% by mess or less, the content of the metal oxide particles becomes relatively appropriate so that a large difference in refractive index between the high refractive index layer and the low refractive index layer can be easily achieved.

Hereinbelow, each of the aforementioned (a) to (c) is explained in detail.

((a) Carboxyvinyl Polymer)

(a) Carboxyvinyl polymer according to the present invention is characterized in that it has a monomer component containing a carboxylic acid in an amount of 20 to 75% by mass of the entire composition, and examples thereof include a polymer containing carboxyl group such as polyacrylic acid represented by the formula: —($CH_2CH(COOH)$)—, which is commonly referred to as carboxyvinyl polymer, thickening polysaccharides such as alginic acid as a polymer of mannuornic acid and glucuronic acid, hyaluronic acid as a polymer of N-acetylglucosamine and glucuronic acid, or the like.

The carboxyvinyl polymer according to the present invention preferably contains a cross linking agent in an amount of 0.2 to 3% by mass in the entire composition. Further, as for the carboxyvinyl polymer according to the present invention, a water soluble polymer which preferably has pH dependency of viscosity, and thus when prepared as an aqueous solution, the viscosity is low if pH is in an acidic region like pH of, for example, from 2 to 4 but the viscosity increases if pH is, for example, in the range of from 4 to 10, preferably from 4 to 7. In other words, it preferably has characteristics that, in a low pH region, the coating liquid containing a carboxyvinyl polymer which has pH dependency of viscosity has a lower viscosity, but in a region with pH exceeding 4, the coating liquid containing a carboxyvinyl polymer has a higher viscosity.

As for the carboxyvinyl polymer according to the present invention, CARBOPOL 941, CARBOPOL 934, CARBOPOL 934P, CARBOPOL 940 (weight average molecular weight, of 4000000), and CARBOPOL ULTREZ 10 (all trade names), as polyallylpentaerythritol and CARBOPOL 976 (trade name) as acrylic acid polymer cross linked with divinyl glycol manufactured by B. P. Goodrich Company, HIBISWAKO 103, HIBISWAKO 104, HIBISWAKO 105, HIBISWAKO 204, HIBISWAKO 304 (all trade names) or the like manufactured by Wako Pure Chemical Industries, Ltd., Aqupec (trade name) manufactured by Sumitomo Seika Chemicals Company, Limited, JUNLON (trade name) manufactured by Nippon Pure Chemical Co., Ltd., or the like are preferably used in the present invention. Each carboxyvinyl polymer described above is a carboxyvinyl polymer which has the monomer component containing a carboxylic acid in an amount of 20 to 75% by mass of the entire composition.

Further, as for the carboxyvinyl polymer according to the present invention, each polymer described above may be used after subjecting it to an ultrasonication treatment according to the method described in JP 11-130661 A.

The weight average molecular weight of the carboxyvinyl polymer according to the present invention is, in order to increase the viscosity of an obtained coating liquid to a desired viscosity, 150000 or higher, preferably in particular 200000 or higher, but also 2,000,000 or lower.

The addition amount of the carboxyvinyl polymer in a coating liquid for forming the refractive index layer according to the present invention is, in order to obtain a favorable gel-like composition by having sufficiently increased viscosity of the coating liquid, 0.01% by mass or more, and preferably 0.2% by mass or more with respect to the entire binder contained in the coating liquid. Further, in order to remove any concerns over a situation that viscosity increase of the coating liquid for forming a refractive index layer is not acknowledged while only the cost increases, it is 5.0% by mass or less, and preferably 4.0% by mass or less.

((b) Copolymer Having pH Dependency of Viscosity)

The copolymer having pH dependency of viscosity is a water soluble polymer which has a characteristic that, when prepared as an aqueous solution, the viscosity is low if pH is in an acidic region like pH of from 2 to 4 but the viscosity increases if pH is increased to, for example 4 to 10, preferably from 4 to 7. Specifically, it indicates a polymer having a characteristic that, when prepared as a 1% aqueous polymer solution, it has a region in which the viscosity is increased by 10 times or more as pH increases by 1.0 in a pH region of from 3 to 10. In other words, it has characteristics that, in a low pH region, the coating liquid containing a polymer which has pH dependency of viscosity has a lower viscosity, but in a region with a pH higher than 4, the coating liquid has a higher viscosity.

The copolymer having pH dependency of viscosity according to the present invention is not particularly limited, if it is a copolymer which yields a change in viscosity with respect to pH change as described above. However, a copolymer consisting of, as polymerization components, a monomer having vinyl amide and a monomer having a vinyl carboxylic acid is particularly preferable.

Vinyl amide is preferably a compound selected from vinyl pyrrolidone, vinyl caprolactam, N-vinyl formamide, N-vinyl acetamide, N-vinyl-methylacetamide, and a mixture thereof. Among them, vinyl pyrrolidone is particularly preferable.

Further, a vinyl carboxylic acid is preferably a compound selected from (meth)acrylic acid, crotonic acid, itaconic acid, maleic acid, and a mixture thereof. Among them, (meth)acrylic acid is particularly preferable.

As for the cross linking agent for the copolymer having pH dependency of viscosity of the present invention, a cross linking agent, having at least two polymerizable free radical groups in the molecule is preferable. Preferred examples thereof include pentaerythritol triallyl ether, pentaerythritol triacrylate, pentaerythritol tetraacrylate, and methylene bisacrylamide.

The copolymer having pH dependency of viscosity according to the present invention preferably contains a monomer compound having vinyl amide in an amount of 25 to 80% by mass of the entire composition, a monomer compound having a vinyl carboxylic acid in an amount of 20 to 75% by mass of the entire composition, and a cross linking agent in an amount of 0.2 to 3.0% by mass of the entire composition. Further, if composition of each component is within the range defined above, lauryl (meth)acrylate, stearyl (meth)acrylate, alkyl (meth)acrylamide, or alkyl (meth)acrylate may be contained as another monomer of one type or plural types. Examples of the alkyl group include a linear or branched alkyl group having 1 to 30 carbon atoms and polyethylene oxide.

As for the method of producing the copolymer having pH dependency of viscosity of the present invention, polymerization can be carried out in an organic solvent, which is apolar and readily removable, in an amount of 75 to 90% by mass with respect to the total mass of the monomer and cross linking agent, in the presence of a radical polymerization initiator in an amount of 0.1 to 0.0% by mass with respect to the total mass or the monomers.

For the coating liquid for forming each refractive index layer to have a sufficiently high viscosity required for coating, weight average molecular weight of the copolymer having pH dependency of viscosity of the present invention is preferably 150000 or higher, and particularly preferably 200000 or higher. It is also preferably 2000000 or lower.

In order to contain the copolymer having pH dependency of viscosity of the present invention in at least one layer of the low refractive index layer and the high refractive index layer of the infrared shielding film of the present invention, an aqueous solution of the copolymer at about 0.2 to 2.0% by mass or so can be added in a desired amount to the coating liquid for forming refractive index layer which contains water, the binder, and the metal oxide particles. Preparation of the coating liquid for forming refractive index layer can be performed by using a known means for stirring and mixing at an appropriate temperature in the range of 30 to 80° C.

The addition amount of the copolymer having pH dependency of viscosity of the present invention, which is contained in the coating liquid for forming refractive index layer is, in order to obtain a favorable gel-like composition by having sufficiently increased viscosity of the coating liquid, 9.01% by mass or more, and more preferably 0.2% by mass or more with respect to the entire binder amount contained in the coating liquid. Further, in order to remove any concerns over a situation that an increase in the mixture content is not observed while only the cost increases, it is 5.0% by mass or less, and preferably 4.0% by mass or less.

((c) Modified Polyvinyl Alcohol)

Specific mode of the modified polyvinyl alcohol is not particularly limited, and known materials of the related art obtained by performing various modification treatments can be suitably used.

As for the polyvinyl alcohol as a raw material of the modified polyvinyl alcohol used in the present invention, it has average polymerization degree of about 200 to 2400. Preferably, if has average polymerization degree of about 900 to 2400. More preferably, it has average polymerization degree of about 1300 to 1700. Further, saponification degree or the polyvinyl alcohol is preferably about 60 to 100% by mole, and more preferably 78 to 96% by mole. The saponified polyvinyl alcohol can be produced by radical polymerization of vinyl acetate and suitable saponification of the obtained vinyl acetate. Production of desired polyvinyl alcohol can be achieved by controlling suitably the polymerization degree and saponification degree according to a method known per se.

Meanwhile, a commercially available product may be used as partially saponified polyvinyl alcohol. Examples of the preferred commercially available polyvinyl alcohol product include GOSENOL EG05, EG25 (manufactured by Nippon Synthetic Chemical Industry Co., Ltd.), PVA203 (manufactured by Kuraray Co., Ltd.), PVA204 (manufactured by Kuraray Co., Ltd.), PVA205 (manufactured by Kuraray Co., Ltd.), JP-04 (manufactured by JAPAN VAM & POVAL Co., Ltd.), and JP-05 (manufactured by JAPAN VAM & POVAL Co., Ltd.). Meanwhile, as a raw material of the modified polyvinyl alcohol, not only one type of the polyvinyl alcohol may be used but also two or more types of polyvinyl alcohols having different saponification degree may be suitably used in combination depending on purpose. For example, it is possible to mix and use polyvinyl alcohol with average polymerization degree of 300 and polyvinyl alcohol with average polymerization degree of 1500.

As for the modified polyvinyl alcohol used in the present invention, those obtained by performing one or more modification treatments of the polyvinyl alcohol described above as a raw material can be used. Examples thereof include amine modified polyvinyl alcohol, ethylene modified polyvinyl alcohol, a carboxylic acid modified polyvinyl, alcohol, diacetone modified polyvinyl alcohol, and thiol modified polyvinyl alcohol. As modified polyvinyl alcohol, a commercially available product may be used or a product produced by a method known in the related field may be used.

Further, as modified polyvinyl alcohol of the present invention, modified polyvinyl alcohol such as polyvinyl alcohol with cation modified terminal, an anion modified polyvinyl alcohol, having an anionic group, or non-ion modified polyvinyl alcohol can be also used.

Examples of the cation modified polyvinyl alcohol include a polyvinyl alcohol having a primary to tertiary amino group or a quaternary ammonium group in a main chain or a side chain of the polyvinyl alcohol as described in JP 61-10483 A, and it is obtained by saponification of a copolymer of an ethylenically unsaturated monomer having a cationic group and vinyl acetate.

Examples of the ethylenically unsaturated monomer having a cationic group include trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxyetyltrimethylammonium chloride, trimethyl-(2-methacrylamidepropyl) ammonium chloride, and N-(1,1-dimethyl-3-dimethylaminopropyl)acrylamide. The proportion of the cation modified group in the cation modified polyvinyl alcohol is 0.1 to 10% by mole, and preferably 0.2 to 5% by mole with respect to vinyl acetate.

Examples of the anion modified polyvinyl alcohol include polyvinyl alcohol having an anionic group described in JP 1-206088 A, a copolymer of vinyl alcohol and a vinyl compound having a water soluble group described in JP 61-237681 A and JP 63-307979 A, and modified polyvinyl alcohol having a water soluble group described in JP 7-283265 A.

Examples of the non-ion modified polyvinyl alcohol include polyvinyl alcohol derivatives having a polyalkylene oxide group added to part of vinyl alcohol described in JP 7-9758 A, and a block copolymer of a vinyl compound having a hydrophobic group and vinyl alcohol described in JP 8-25795 A.

Among them, the modified polyvinyl alcohol used in the present invention is preferably a copolymer (graft copolymer) which is obtained by copolymerization or (1) polyvinyl alcohol having average polymerization degree of 200 to 2400 and (2) one or two or more polymerizable vinyl monomer selected from a group consisting of an unsaturated carboxylic acid, a salt thereof, and an ester thereof.

Meanwhile, for a case in which the modified polyvinyl alcohol is a graft copolymer described above, various modified polyvinyl alcohols described above may be also used as (1) a polyvinyl alcohol having average polymerization degree of 200 to 2400 that constitutes the graft copolymer.

Examples of the polymerizable vinyl monomer subjected to polymerization with (modified) polyvinyl alcohol as a raw material include an unsaturated carboxylic acid such as acrylic acid, methacrylic acid, crotonic acid, fumeric acid, maleic acid, or itaconic acid, or a salt thereof (e.g., alkali metal salts, ammonium salts, or alkylamine salts), an ester thereof (e.g., substituted or non-substituted alkyl esters, cyclic alkylesters, or polyalkylene glycol esters), unsaturated nitriles, unsaturated amides, aromatic vinyls, aliphatic vinyls, and unsaturated bond-containing heterocycles. Specific examples thereof include (a) as acrylic esters, methyl acrylate, ethyl acrylate, butyl acrylate, isobutyl acrylate, cyclohexyl acrylate, 2-ethylhexyl acrylate, hydroxyethyl acrylate, polyethylene glycol acrylate (ester of polyethylene glycol and acrylic acid), and polypropylene glycol acrylate (ester of polypropylene glycol and acrylic acid), (b) as methacrylic acid esters, methyl methacrylate, ethyl methacrylate, butyl, methacrylate, isobutyl methacrylate, cyclohexyl methacrylate, 2-ethylhexyl methacrylate, hydroxyethyl methacrylate, and polyethylene glycol methacrylate (ester or polyethylene glycol and methacrylic acid), (c) as unsaturated nitriles, acrylonitrile and methacrylonitrile, (d) as unsaturated amides, acrylamide, dimethylacrylamide, and methacrylamide, (e) as aromatic vinyls, styrene and α-methylstyrene, (f) as aliphatic vinyls, vinyl acetate, and (g) as unsaturated bond-containing heterocycles, N-vinyl pyrrolidine and acryloylmorpholine.

Among them, true polymerizable vinyl polymer is preferably one or two or more types selected from a group consisting of acrylic acid, methacrylic acid, fumaric acid, maleic acid, itaconic acid, and a salt thereof, and unsaturated carboxylic ester represented by the following formula (I):

[Chem. 2]

$$CH_2=C(R_1)-COOR_2 \quad (I)$$

In the formula, $R_1$ represents a hydrogen atom or a methyl group and $R_2$ represents an alkyl group with 1 to 4 carbon atoms. In addition, although one or two or more types of the polymerizable vinyl monomer may be combined and used for copolymerization with a polyvinyl alcohol, preferred combination includes a copolymerization of a mixture of acrylic acid and methacrylic acid ester (e.g., methyl methacrylate), with a polyvinyl alcohol. Herein, the content ratio between the above (1) and (2) for copolymerization of a polyvinyl alcohol, and a polymerizable vinyl monomer is, although not particularly limited, preferably 0.5:9.5 to 9.5:0.5, more preferably 0.5:9.5 to 3:7, and still more preferably 1.25:8.75 in terms of (1):(2) (mass ratio), from the viewpoint of sufficient exhibition of the effect of the present invention. Further, when a mixture of acrylic acid and methyl methacrylate is used as a polymerizable vinyl monomer, the content ratio between acrylic acid and methyl methacrylate in the mixture is, although not particularly limited, preferably 3:7 to 0.5:9.5, and more preferably about 1.25:8.75 in terms of acrylic acid:methyl methacrylate (mass ratio), from true viewpoint of sufficient exhibition of the effect of the present invention. Further, preferred graft copolymer consists of polyvinyl alcohol (average polymerization degree of about 200 to 2400), methyl methacrylate, and acrylic acid, in which the content ratio of each constitutional component in the graft copolymer is preferably about 60 to 90:7 to 38:0.5 to 12, and mere preferably about 80:17.5:2.5 in terms of polyvinyl alcohol:acrylic acid:methyl methacrylate (mass ratio). The mass ratio can be measured by NMR.

The modified polyvinyl alcohol of the present invention can be produced by a modification treatment of a polyvinyl alcohol or a derivative thereof according to a method known per se.

In particular, examples of the method of producing the graft copolymer as a modified polyvinyl alcohol include radical polymerization, e.g., a method known per se such as solution polymerization, suspension polymerization, emulsion polymerization, or bulk polymerization, and it may be performed under common conditions for polymerization for each. The polymerization reaction is generally performed in wafer, an organic solvent (methanol, ethanol, cellosolve, and carbitol), or a mixture thereof in the presence of a polymerization initiator, and if necessary, a reducing agent (e.g., sodium erysorbic acid, sodium metabisulfite, and ascorbic acid), a chain transfer agent (e.g., 2-mercaptoethanol, α-methylhexyl dimer, 2-ethylhexyl thioglycolate, and lauryl mercaptan), or a dispersant (e.g., a surface active agent such as a sorbitan ester or a lauryl alcohol). Further, the method for removing unreacted monomers, drying and pulverization method or the like can be any known method, and they are not particularly limited.

As for the polymerization initiator, those used in the related field may be used. Examples thereof include inorganic peroxides like potassium persulfate, ammonium persulfate, and hydrogen peroxide, organic peroxides like peracetic acid, tertiary butyl hydroperoxide, and di-n-propylperoxydicarbonate, and an azo compound such as 2,2'-azobis (2-aminodipropane) hydrochloride and 2,2'-azobis (2,4-dimethylvaleronitrile).

Use amount of the polymerization initiator is, with respect to 100 parts by mass of the polymerizable vinyl monomer, generally 0.1 to 5.0 parts by mass or so, and it is more preferably 0.5 to 3.0 parts by mass.

Further, according to the present invention, the refractive index layer (the high refractive index layer or the low refractive index layer) containing the aforementioned modified polyvinyl alcohol as a binder may contain a curing agent. Preferred examples of the curing agent include boric acid, a salt thereof, borax, and an epoxy-based curing agent.

To include the modified polyvinyl alcohol of the present invention in at least one layer of the low refractive index layer and the high refractive index layer of the infrared shielding film of the present invention, it is sufficient that, as an aqueous solution at an appropriate concentration, a desired amount thereof is added to the coating liquid for forming refractive index layer containing water, a binder, and metal oxide particles. Preparation of the coating liquid for forming refractive index layer can be carried out using a known means for stirring and mixing at a suitable temperature in the range of 30 to 80° C.

The addition amount of the modified polyvinyl alcohol of the present invention to be contained in the coating liquid for forming refractive index layer is, to have a favorable gel-like composition in accordance with sufficient viscosity increase of the coating liquid, 0.01% by mass or more, and preferably 0.2% by mass or sore. Further, in order to remove any concerns ever a situation that increase of the a mixture content is not observed only due to true cost increase, it is 5.0% by mass or less, and preferably 4.0% by mass or less.

Meanwhile, according to the studies by the inventors, it was found that the film formed by a method of using a thermocurable silicone resin or a UV curable acryl resin or by a method of forming a film using sol (Patent Literature 1 and Patent Literature 3) is too stiff and has insufficient flexibility, and thus there are problems that the coating film is disturbed due to repeated change in a temperature and humidity over time particularly after production to application on a windowpane of a building a vehicle, yielding a reduced infrared reflectance or visible light transmittance, or it is impossible to obtain sufficiently the desired performance caused by an occurrence of cracks on surface of the coating film during handling like adhesion on a window, delivery, or the like doe to reduced flexibility.

In this regard, by using the modified polyvinyl alcohol as a binder, the occurrence of the problems like those described above can be also suppressed.

In other words, the infrared shielding film as a subject of the present invention is generally produced with high productivity using coating liquids for each of the high refractive index layer and the low refractive index layer and coating the unit consisting of each coating liquid such that if has a successive multilayer constitution. Further, when a water based coating liquid unit is used, it is necessary to secure a refractive index designed for each layer by preventing as much as possible the mixing of the coating liquid components for the high refractive index layer and the low refractive index layer. To do so, it is important to suppress interlayer mixing caused by diffusion of the metal oxide particles between each coating liquid unit. Meanwhile, for control of the refractive index, it is necessary to increase the content of the metal oxide particles in each of the high refractive index layer and the low refractive index layer. However, a coating film with a high content of the metal oxide particles has poor flexibility, and the coating film easily exhibits cracks when a temperature or humidity is changed, and as a result, the infrared shielding performance as a basic function is significantly impaired.

On the other hand, when at least one layer of the high refractive index layer and the low refractive index layer contains, as a binder, the modified polyvinyl alcohol, the metal oxide particles and modified polyvinyl alcohol contained in the refractive index layer interacts with each other, and as a result, the interlayer mixing between high refractive index layer and the low refractive index layer is suppressed and desirable infrared shielding performance is achieved. In addition, as a result of giving flexibility to the refractive index layer according to the interaction, it is believed that an infrared shielding film having excellent durability with little occurrence of cracks or the like can be provided even under a changed condition of temperature and humidity. From the viewpoint of exhibition of the action effects, it is particularly preferable to use (c) modified polyvinyl alcohol among one polymers from the above (a) to (c) in the present invention.

(Other Binders)

As for the binder other than the polymers from the above (a) to (c) which may be used in the present invention, any binder can be used without limitation if a coating film can be formed with the high refractive index layer and the low refractive index layer containing the metal oxide particles. However, considering environmental problems or flexibility of a coating film, a water soluble polymer (in particular, celluloses, gelatins, thickening polysaccharides, a polymer with a reactive functional group, and a polyvinyl acetal resin) is preferable. By using the water soluble polymer, interface mixing with other layer can be suppressed at the time of laminating a layer. The water soluble polymer may be used either singly or as a mixture of two or more types. Meanwhile, among the binders that are exemplified below, those included in the concept of the (a) to (c) are treated as the binder of (a) to (c).

With regard to the infrared shielding film of the present invention, it is preferable for the high refractive index layer and the low refractive index layer to contain a water soluble polymer such as celluloses, thickening polysaccharides, or a polymer with a reactive functional group. The water soluble polymer referred to in the present invention is defined as a polymer in which, when the water soluble polymer is dissolved in water at a concentration of 0.5% by mass at a temperature exhibiting the largest solubility of the polymer, has the mass of the insoluble material separated by the filtration is 50% by mass or less based on the mass of the added water soluble polymer when filtered with G2 glass filter (the maximum pore size from 40 to 50 μm).

<Celluloses>

As for the celluloses which may be used in the present invention, a water soluble cellulose derivative can be preferably used and examples thereof include a water soluble cellulose derivative such as carboxymethyl cellulose (cellulose carboxymethyl ether), methyl cellulose, hydroxymethyl cellulose, hydroxyethyl cellulose, or hydroxypropyl cellulose, and carboxy group-containing celluloses such as carboxymethyl cellulose (cellulose carboxymethyl ether) or carboxyethyl cellulose. In addition, there are cellulose derivatives such as nitrocellulose, cellulose acetate propionate, cellulose acetate, or cellulose sulfuric acid ester.

<Gelatins>

As for the gelatins, various gelatins which have been widely used in the silver halide photosensitive material field of the related art may be applicable. Examples of the gelatins include, in addition to lime-treated gelatin, acid-treated gelatin and alkali-treated gelatin, enzyme-treated gelatin which is subjected to enzyme treatment in the production process of gelatins, and gelatin derivatives, that is, a modified gelatin which has an amine group, an imino group, a hydroxyl group, or a carboxyl group as a functional group in the molecule and is modified with a reagent having a group capable of reacting with the above groups. The general production methods of gelatin are well known, and may be referred to, for example, page 55 in Fourth Edition of The Theory of Photographic Process by T. H. James 1977 (Macmillan), pages 72 to 75 in Science Photograph Manual (First volume) published by Maruzen, pages 119 to 124 in Silver-halide Photography of Basic Photographing Engineering (CORONA PUBLISHING Co., Ltd.). Further, the reference may be made to "gelatin" described in Item IX, Vol. 176, No. 17643 (December, 1978) in Research Disclosure. The gelatin may be used either singly or in combination of two or more types.

<Thickening Saccharides>

The thickening polysaccharides usable in the present invention are net specifically limited to, and examples of the thickening polysaccharides include natural simple polysaccharides, natural composite polysaccharides, synthetic simple polysaccharides, and the synthetic composite polysaccharides, which are generally known. The details of these polysaccharides may be referred to "Biochemistry Encyclopedia (the second edition) published by Tokyo Kagaku Dojin Co., Ltd.", and page 21 of Volume 31, (1938) in "Food Industry" or the like.

The thickening polysaccharides described in the present invention mean the polymer of sugars, which have many hydrogen bonding groups in the molecules. They are the polysaccharides which are characterized in having a large viscosity difference between a viscosity at the time of a low temperature and a viscosity at the time of a high temperature due to a difference in intermolecular hydrogen bonding depending on the temperature. Further, by adding with metal oxide fine particles, they show viscosity increase believed to be caused by the hydrogen bonding with the metal hydroxide fine particles at a low temperature, and with regard to the viscosity increase width, the polysaccharides have a viscosity increasing ability such that the addition of the polysaccharides increases a viscosity at 15° C. by 1.0 mPa·s or more, preferably 5.0 mPa·s or more, and more preferably 10.0 mPa·s or more.

Examples of the thickening polysaccharides applicable to the present invention, include: galactans (for example, agarose, and agaropectin), galactomannoglycan (for example, locust bean gum, and guaran), xyloglucan (for example, tamarind gum), glucomannoglycan (for example, konjac mannan, glucomannan of wood origin, xanthan gum, etc.), galactoglucomannoglycan (for example, glycan of needle-leaf tree material origin), arabinogalactoglycan (for example, glycan of soybean origin, and glycan of microorganism origin), glucorhamnoglycan (for example, and gellan gum), glycosaminoglycans (for example, hyaluronic acid, and keratan sulfate), alginic acid and alginin acid salts; and natural polymer polysaccharides originating from red alga, such as agar, κ-carrageenan, λ-carrageenan, ι-carrageenan, and furcelleran. From the viewpoint of not lowering the dispersion stability of metal oxide fine particles coexisting in a coating liquid, the constitutional unit of the thickening polysaccharides preferably does not have a carboxylic acid group or a sulfonic acid group. Preferable examples of such thickening polysaccharides include polysaccharides consisting of only pentose, such as L-arabinose, D-ribose, 2-deoxyribose, and D-xylose; or hexose, such as D-glucose, D-fructose, D-mannose, and D-galactose. Specifically preferably usable examples include: tamarind seed gum which is known as xyloglucan including glucose in a main chain and glucose also in a side chain; guar gum, cationized guar gum, hydroxypropyl guar gum, locust bean gum, and tara gum, which are known as galactomannan including mannose in a main chain and glucose in a side chain; and arabinogalactan which includes galactose in a main chain and arabinose in a side chain. In the present invention, tamarind, guar gum, cationized guar gum, and hydroxy-propyl guar gum are preferable.

In the present invention, furthermore, it is preferable that two or more types of thickening polysaccharides are used in combination.

Further, it is preferable in the present invention that thickening polysaccharides such as tamarind, guar gum, cationized guar gum, or hydroxypropyl guar gum are used in combination with gelatins (preferably, acid-treated gelatin).

<Polymers Having Reactive Functional Group>

As for the water soluble polymer applicable to the present invention, polymers having a reactive functional group can be exemplified. Examples thereof include polyvinyl alcohols (not modified ones), polyvinyl pyrrolidones, acrylic resins such as an acrylic acid-acrylonitrile copolymer, a potassium acrylate-acrylonitrile copolymer, a vinyl acetate-acrylic ester copolymer, or an acrylic acid-acrylic ester copolymer, styrene-acrylic acid resins such as a styrene-acrylic acid copolymer, a styrene-methacrylic acid copolymer, a styrene-methacrylic acid-acrylic acid ester copolymer, a styrene-α-methyl styrene-acrylic acid copolymer or a styrene-α-methyl styrene-acrylic acid-acrylic acid ester copolymer, a styrene-sodium styrenesulfonate copolymer, a styrene-2-hydroxyethyl acrylate copolymer, a styrene-2-hydroxyethyl acrylate-potassium styrene sulfonate copolymer, a styrene-maleic acid copolymer, a styrene-maleic anhydride copolymer, a vinyl naphthalene-acrylic acid copolymer, a vinyl naphthalene-maleic acid copolymer, vinyl acetate copolymers such as a vinyl acetate-maleic acid ester copolymer, a vinyl acetate-crotonic acid copolymer, or a vinyl acetate-acrylic acid copolymer, and the salts thereof. Of these, polyvinyl alcohols (not modified ones), polyvinyl pyrrolidones and copolymers containing thereof may be cited as specifically preferable examples.

As for the polyvinyl acetal resin, it is not particularly limited, if it is a polyvinyl acetal resin obtained by acetalization of a polyvinyl alcohol with aldehyde. However, a resin acetalized with a C1 to C10 aldehyde is preferable (acetaldehyde, propionaldehyde, butylaldehyde, or the like). The flexibility can be further improved accordingly. Further, if necessary, two or more types of the polyvinyl acetal reams may be used in combination.

Further, the weight average molecular weight of the polyvinyl acetal resin used in the present invention is preferably 90000 to 400000, more preferably 90000 to 370000, and still more preferably 30000 to 340000. When the weight average molecular weight is within the range, viscosity of the coating liquid for the high refractive index layer does not increase too much during ho production, and thus the coating property is favorable and the performance of the infrared shielding film to be obtained is also favorable.

The weight average molecular weight of the water soluble polymer is preferably 1000 to 200000. More preferably, it is 3000 to 40000.

As the polyvinyl alcohol obtained by hydrolyzing vinyl acetate, preferably used is one having an average polymerization degree of 1,000 or more and particularly preferably used is one having 1,500 to 5,000. Moreover, as the degree of saponification, it is preferably 70 to 100%, and particularly preferably 80 to 99.5%. As for the polyvinyl alcohol, two or more types having different polymerization degree or modification type may be used in combination. Meanwhile, when the polymer having a reactive functional group is used as a binder in the present invention, a curing agent may be used. When the polymer having a reactive functional group is a polyvinyl alcohol, boric acid, a salt thereof, borax, or an epoxy based curing agent or the like are preferable.

In the present invention, a solvent-based binder may be used other than the binders described above. Examples of the preferred solvent-based binder include photocurable type, electronic beam-curable type, or thermocurable type acryl, epoxy, silicone, urethane, fluororesin or the like.

Further, in the present invention, an amide resin, a polycarbonate resin, a polyester resin, a silicone resin, a fluororesin or the like may be used as other binders. Meanwhile, when binders are used in both the low refractive index layer and the high refractive index layer, they may be the same or different from each other.

Examples of the amide resin include an aliphatic amide resin such as 6,6-nylon, 6-nylon, 11-nylon, 12-nylon, 4,6-nylon, 6,10-nylon, or 6,12-nylon, and an aromatic polyamide consisting of an aromatic diamine such as phenylene diamine and an aromatic dicarboxylic acid such as terephthaloyl chloride or isophthaloyl chloride or derivatives thereof.

Examples of the polycarbonate resin include a reaction product between bisphenols such as bisphenol A and derivatives thereof and phosgene or phenyl bicarbonate.

Examples of the polyester resin include an aromatic polyester resin obtained by copolymerization of diols such as ethylene glycol, propylene glycol, or 1,4-butane diols and an aromatic dicarboxylic acid such as terephthalic acid, isophthalic acid, and naphthalene dicarboxylic acid, a copolymer of diols and an aliphatic dicarboxylic acid such as succinic acid or valeric acid, a homopolymer or copolymer of a hydroxycarboxylic acid such as glycolic acid, or lactic acid, and aliphatic polyester like a copolymer of aforementioned diols, an aliphatic dicarboxylic acid, and a hydroxycarboxylic acid.

As for the silicone resin, those having an organic group such as an alkyl group or an aromatic group as a constitutional unit are preferable. Those having an organic group such as a methyl group or a phenyl group are particularly preferable. Specific examples of the silicone resin having an organic group include dimethylpolysiloxane, methylphenylpolysiloxane, diphenylpolysiloxane, and a modified product thereof.

Examples of the fluororesin include a polymer or copolymer resin such as tetrafluoroethylene, hexafluoropropylene, chlorotrifluoroethylene, vinylidene fluoride, vinyl fluoride, or perfluoroalkyl vinyl ether. Further, they may be used either singly or in combination of two or more types, if needed.

[Other Additives]

In the high refractive index layer and the low refractive index layer of the present invention, various additives may be used, if necessary. Examples thereof are described hereinbelow.

(Amino Acid with Isoelectric Point of 6.5 or Less)

The high refractive index layer or the low refractive index layer may contain an amino acid with isoelectric point of 6.5 or less. By containing an amino acid, dispersibility of metal oxide particles in the high refractive index layer or the low refractive index layer can be improved.

As described herein, the amino acid refers to a compound which has an amino group and a carboxyl group in the same molecule. Any type of amino acid such as α-, β-, and γ-type may be applicable. Although an optical isomer exists in some amino acids, in the present invention there is no difference of the effect by optical isomers, and thus any isomer can be used singly or in a racemic form.

The detailed description about an amino acid can be referred to Kagaku Daijiten 1, reduced edition (Kyoritsu Shuppan Co., Ltd.; published in 1960), pages 268 to 270.

Specific examples of the preferred amino acid include asparaginic acid, glutamic acid, glycine, and serine. Glycine and serine are particularly preferable.

At a specific pH, there is a balance between positive and negative charges in an amino acid, yielding overall charge of 0, and such a pH value corresponds to an isoelectric point of an amino acid. The isoelectric point of each amino acid can be measured by isoelectric focusing electrophoresis at a low ionic strength.

(Emulsion Resin)

The high refractive index layer or the low refractive index layer may further contain an emulsion resin. By containing an emulsion resin, flexibility of the film is increased so that processability like adhesion onto a glass or the like is improved.

The emulsion resin is a resin in which resin particles with, for example, an average particle size of about 0.01 to 2.0 μm or so are dispersed in an emulsion state in a water-based medium, and it is produced by emulsion polymerization of an oil-soluble monomer by use of a high molecular dispersant with a hydroxyl group. A basic difference is not observed in the polymer component of an obtained emulsion resin depending on the kind of a dispersant used for the emulsion resin. Examples of the dispersant used at the time of emulsion polymerization include low molecular dispersants such as alkyl sulfonates, alkylbenzene sulfonates, diethylamine, ethylene diamine, and a quaternary ammonium salt, and high molecular dispersants such as polyoxyethylene nonylphenyl ether, polyoxyethylene lauryl acid ether, hydroxyethyl cellulose, and polyvinyl pyrrolidone. If the emulsion polymerization is made by use of a polymer dispersant with a hydroxyl group, it is presumed that hydroxyl groups reside on at least the surface or fine particles. Accordingly, it is considered that the resulting emulsion resin is different in chemical or physical properties of emulsion from the emulsion resin obtained by use of the other dispersants.

The high molecular dispersant with a hydroxyl group means a high molecular dispersant having a weight average molecular weight of 10,000 or more, which is substituted with a hydroxyl group at its side chain or terminal. Examples of the high molecular dispersant include a copolymer of 2-ethyl hexyl acrylate with an acrylic polymer, such as sodium polyacrylate and polyacrylamide; a polyether, such as polyethylene glycol or polypropylene glycol; and a polyvinyl alcohol. Of these, a polyvinyl alcohol is particularly preferable.

Examples of the polyvinyl alcohol used as the high molecular dispersant include: in addition to ordinary polyvinyl alcohols obtained through hydrolysis or polyvinyl acetate, modified polyvinyl alcohols, such as cationically-modified polyvinyl alcohols, anionically-modified polyvinyl alcohols with an anionic group such as a carboxyl group, and silyl-modified polyvinyl alcohols with a silyl group. In the polyvinyl alcohol, as an average degree of polymerization becomes higher, the effect to prevent occurrence of cracks at the time of formation of an ink absorption layer becomes larger. However, the average degree of polymerization being 5,000 or less allows the viscosity of an emulsion resin to become not so high, making it handled easier at the time of production. Accordingly, the average degree of polymerization is preferably 300 to 5,000, more preferably 1,500 to 5,000, and specifically preferably 3,000 to 4,500. The degree of saponification of the polyvinyl alcohol is preferably 70 to 100% by mole, and more preferably 80 to 99.5% by mole.

Examples of the resin which polymerizes in an emulsion by the above-mentioned high molecule dispersants include: ethylene monomers, such as acrylic acid ester, methacrylic acid ester, vinyl-based compound, and styrene-based compound; and homopolymers or copolymers of diene-based compounds, such as butadiene and isoprene. Specific examples include an acrylic resin, a styrene-butadiene based resin and an ethylene-vinyl acetate based resin.

(Other Additives)

In addition to above, the high refractive index layer or the low refractive index layer may contain, for example, a plasticizer, a coating aid, various other additives, or the like.

Examples of the plasticizer which is used in the present invention include an organic ester plasticizer such as monobasic organic acid ester or polybasic organic acid ester and a phosphoric acid plasticizer such as organic acid phosphoric acid plasticizer or organic phosphorus acid plasticizer. The plasticizer is preferably a plasticizer in a liquid state.

Examples of the monobasic organic acid ester include, although not particularly limited, a glycol ester obtained by a reaction between a glycol such as triethylene glycol, tetraethylene glycol, or tripropylene glycol and a monobasic organic acid such as butyric acid, isobutyric acid, capronic acid, 2-ethylbutyric acid, heptyl acid, n-octyl acid, 2-ethylhexyl acid, pelargonic acid (n-nonyl acid), or decyl acid. Among them, a triethylene glycol dialkyl acid ester such as triethylene glycol dicapronic acid ester, triethylene glycol-di-2-ethylbutyric acid ester, triethylene glycol-di-n-octyl acid eater, or triethylene glycol-di-2-ethylhexyl acid ester is preferable.

Examples of the polybasic organic acid ester include, although not particularly limited, an ester compound between a polybasic organic acid like adipic acid, sebacic acid, and azellaic acid and an alcohol having a linear or branched structure with 4 to 8 carbon atoms. Among them, dihexyl adipate, dibutylsebacic acid ester, dioctylazellaic acid ester, dibutylcarbitol adipic acid ester, or the like are preferable.

Examples the organic ester plasticizer include, although not particularly limited, triethylene glycol-di-2-ethylbutyrate, triethylene glycol-di-2-ethylhexanoate, triethylene glycol dicaprylate, triethylene glycol-di-n-octanoate, triethylene glycol-di-n-heptanoate, tetraethylene glycol-di-2-ethylhexanoate, tetraethylene glycol-di-n-heptanoate, dibutylsebacate, dioctylazellate, dibutylcarbitol adipate, ethylene glycol-di-2-ethylbutyrate, 1,3-propylene glycol-di-2-ethylbutyrate, 1,4-butylene glycol-di-2-ethylbutyrate, diethylene glycol-di-2-ethylbutyrate, diethylene glycol-di-2-ethylhexanoate, dipropylene glycol-di-2-ethylbutyrate, triethylene glycol-di-2-ethylpentanoate, tetraethylene glycol-di-2-ethylbutyrate, diethylene glycol dicapriate, triethylene glycol-di-n-heptanoate, tetraethylene glycol-di-n-heptanoate, triethylene glycol diheptanoate, tetraethylene glycol diheptanoate, dihexyl adipate, dioctyl adipate, hexyl cyclohexyl adipate, a mixture of heptyl adipate and nonyl adipate, diisononyl adipate, heptyl nonyl adipate, dibutyl sebacate, oil-modified sebacic acid alkyd, and a mixture of phosphoric acid ester and adapic acid ester.

Examples of the organic phosphoric acid plasticizer include, although not particularly limited, tributoxyethyl phosphate, isodecyl phenyl phosphate, and triisopropyl phosphate.

As for the coating aid used in the present invention, a siloxane based surface active agent such as polyether modified polydimethylsiloxane or a fluorine based surface active agent or the like may be used. The fluorine based surface active agent is more preferable.

Specific examples of the polyether modified polydimethylsiloxane include polyethylene oxide, polypropylene oxide, polybutylene oxide, and polydimethylsiloxane modified with a mixture thereof. The polyether modified polydimethylsiloxane is obtained by suitably varying the amount or mixing ratio of polyethylene oxide, polypropylene oxide, or polybutylene oxide.

The siloxane based surface active agent can be obtained as a commercially available product, and examples thereof include BYK-302, BYK-306, BYK-307, BYK-320, BYK-323, BYK-330, BYK-331, BYK-333, BYK-337, BYK-340, BYK-344, BYK-370, BYK-375, BYK-377, and BYK-UV3500 manufactured by BYK Japan KK, KF-945, KF-352A, KF-640, KF-351A, KF-354L, X-22-4272, and X-22-6266 manufactured by Shin-Etsu Chemical Co., Ltd., and EFKA-3030, EFKA-3031, EFKA-3034, EFKA-3299, EFKA-3232, EFKA-3288, EFKA-3033, EFKA-3035, EFKA-3580, EFKA-3883, EFKA-3239, EFKA-3236, and EFKA-3522 manufactured by EFKA. The addition amount of the siloxane based surface active agent it preferably 0.01 to 10% by mass, and more preferably 0.05 to 2.0% by mass with respect to the total mass of the low refractive index layer (solid content mass).

As for the fluorine based surface active agent include, a surface active agent having a perfluoroalkyl group is preferable, and examples thereof include a non-ionic, a cationic, an anionic, and an amphoteric fluorine based surface active agent.

The fluorine based surface active agent can be obtained as a commercially available product, and examples thereof include SURFLON S-211, S-221, 3-231, S-241, S-242, S-243, and S-420 manufactured by AGC Seimi Chemical Co., Ltd. and UNIDAIN DS-101, DS-202, DS-301, or the like manufactured by Daikin Industries, Ltd. The addition amount of the fluorine based surface active agent as preferably 0.01 to 10% by mass, and still more preferably 0.05 to 2.0% by mass with respect to the total mass of the low refractive index layer (solid content mass).

Examples of various types of additives applicable to the coating liquid for the high refractive index layer and low refractive index layer according to the present are exemplified herein below. For examples, various known additive as follows can be mentioned: an ultraviolet absorbing agent described in JP 57-74193 A, JP 57-87988 A, and JP 62-261476 A, an anti-discoloring agent and various anionic, cationic, and non-ionic surface active agents described in JP 57-74192 A, JP 57-87989 A, JP 60-72785 A, JP 61-146591 A, JP 1-95091 A, and JP 3-13376 A, a fluorescent whitener described in JP 59-42993 A, JP 59-52689 A, JP 62-280069 A, JP 61-242871 A, and JP 4-219266 A, pH adjusters, such as sulfuric acid, phosphoric acid, acetic acid, citric acid, sodium hydroxide, potassium hydroxide, and potassium carbonate, a defoaming agent, a lubricant such as diethylene glycol, an antiseptic agent, an antifungal agents, an antistatic agent, a mattifying agent, a heat stabilizing agent, an anti-oxidizing agents, a flame retardant, a crystal nucleating agent, inorganic particles, organic particles, a viscosity-lowering agent, a lubricating agent, an infrared absorbing agent, a colorant, and a pigment.

The infrared shielding film of the present invention may have, under the substrate or on top of the outermost layer on opposite side of the substrate, one or more functional layer such as a conductive layer, an anti-static layer, a gas barrier layer, as easy adhesion layer (adhesive layer), an anti-fouling layer, a disinfecting layer, a droplet flowing layer, a lubricating layer, a hard coat layer, an anti-wearing layer, an anti-reflection layer, an electromagnetic wave shield layer, a UV absorbing layer, an infrared absorbing layer, a print layer, a fluorescence luminescent layer, a hologram layer, a release layer, a tacky layer, an adhesive layer, an infrared out layer (e.g., a metal layer and a liquid crystal layer) other than the high refractive index layer and the low refractive index layer of the present invention, a colored layer (layer for absorbing visible light), or an intermediate film layer used for laminated glass for the purpose of imparting additional functions.

[Preferred Mode of Low Refractive Index Layer (with Presence of Pores)]

For the purpose of lowering the refractive index of the low refractive index layer, it is preferable that the low refractive index layer contains pores. According to the purpose, in the related art, a technique of producing an infrared shielding film by successive film forming by turns the high refractive index layer and the low refractive index layer while having pores in the low refractive index layer is known. However, according to the technique, the high a refractive index layer sol is impregnated in the pores formed in the low refractive index layer to cause mixing at layer interface, and thus there is a problem that the infrared shielding (reflecting) property of the obtained laminate film is lowered. In addition, as the lamination is performed by successive film forming, the operation is cumbersome so that there are many industrial problems.

To reduce an occurrence of such problems, it is preferable in the present invention that, for forming the low refractive index layer, a precursor for the low refractive index layer containing a thermally decomposable resin is heated for thermal decomposition of the thermally decomposable resin so that pores are created in the low refractive index layer. Specifically, by heating a precursor for laminate film which contains the precursor for the high refractive index layer and the precursor for the low refractive index layer containing metal oxide particles and a thermally decomposable resin, the process of forming pores by thermal decomposition of the thermally decomposable resin can be carried out. At that time, heating for thermal decomposition of the thermally decomposable resin is preferably carried out at 80° C. or lower. Further, it is preferable that the precursor for the low refractive index layer additionally contains a radical generator. Further, the metal oxide particles contained in the low refractive index layer (precursor) are preferably silica hollow fine particles, and the formation of the laminate film precursor on a substrate is preferably performed by a simultaneous multilayer coating.

According to the present embodiment, the thermally decomposable resin contained in the precursor for the low refractive index layer is thermally decomposed by heating to yield a monomer, and as the monomer is dissipated (evaporated) by heating, pores are created in the low refractive index layer. When the low refractive index layer has pores, the refractive index is lowered so that the difference in refractive index between the high refractive index layer are the low refractive index layer increases. As a result, an infrared shielding film having excellent infrared shielding property is obtained according so the production method of the present embodiment.

Herein below, the present embodiment is explained in order.

(Precursor for Low Refractive Index Layer and Precursor for High Refractive Index Layer)

According to the present embodiment, the laminate film precursor in which the precursor for the low refractive index layer and the precursor for the high refractive index layer are laminated is first formed. At that time, a coating liquid for the low refractive index layer to form the precursor for the low refractive index layer and a coating liquid for the high refractive index layer to form the precursor for the high refractive index layer are prepared. The coating liquid for the low refractive index layer essentially contains metal oxide particles and a thermally decomposable resin. The coating liquid for the low refractive index layer may also contain a binder, a fine particle dispersant, a radical generator, and a solvent, if needed. The coating liquid for the high refractive index layer essentially contains the resin only, or essentially contains metal oxide particles (preferably, titanium oxide particles or zirconium oxide particles) and a binder, and if necessary, else contains a fine particle dispersant and a solvent. The coating liquid for the low refractive index layer and the coating liquid for the high refractive index layer may further contain various additives such as a plasticizer or a coating aid. The coating liquid is prepared by mixing each components described above in a solvent. Herein below, the components used for the coating liquid for the low refractive index layer and the coating liquid for the high refractive index layer are described.

(Metal Oxide Particles)

Specific mode of the metal oxide particles that are tuned in the coating liquid for the low refractive index layer and the coating liquid for the high refractive index layer are as described above, and no further detailed explanations are given here.

(Thermally Decomposable Resin)

As for the thermally decomposable resin used for the coating liquid for the low refractive index layer, a polymer having a ceiling temperature of 80° C. (hereinbelow, it may be also referred to as "Tc") preferable, as the pores are formed while the shape of the formed laminate film precursor is maintained. Examples thereof include a resin described in The Polymer Handbook, $4^{th}$ Ed, J. Wiley & Sons, New York, edited by J. Brandrup and others, 2003, pages II 393 to II 407. The ceiling temperature (Tc) of a resin is defined as the temperature at which the free energy ($\Delta F$) for polymerization is equal to 0 ($\Delta F = \Delta H - T\Delta S = 0$), i.e. and $Tc = \Delta H/\Delta S$ (herein, $\Delta H$ is equal to the enthalpy for polymerization and $\Delta S$ is equal to the entropy for polymerization). For a common chain polymerization, the depolymerization reaction rate is higher than the polymerization reaction rate at the temperature higher than Tc. At the temperature lower than Tc, the polymer grows, but as the reaction temperature increases, it reaches Tc at which the growth rate constant is equal to the depolymerization rate constant. At the temperature higher than Tc, the depolymerization is thermally advantageous, and as a result, the resin becomes unstable and depolymerizes into a monomer component.

Examples of the thermally decomposable resin used in the present invention include a polymer of lactam such as poly-δ-valerolactam (Tc=60° C.) or poly-γ-butyrolactam (Tc=76° C.), poly-α-methylstyrene (Tc=54 to 61° C.), polyoxephane (Tc=41.5° C.), polyformaldehyde (Tc=30° C.), and a copolymer in which molar ratio between sulfur dioxide and unsaturated olefin having 2 to 6 carbon atoms is 1:1, and examples of the unsaturated olefin include a copolymer using allyl acetate (Tc of the copolymer=45° C.), allyl alcohol (Tc=76° C.), allyl ethyl ether (Tc=68° C.), allyl formate (Tc=45° C.), 1-butene (Tc=64° C.), 2-butene (Tc=38 to 46° C.), 1-hexadecene (Tc=69° C.), 1-hexene (Tc=60° C.), or 1-pentene (Tc=63° C.), polytrichloro-acetaldehyde (Tc=18° C.), poly-n-valeraldehyde (Tc=−42° C.), polyacetaldehyde (Tc=−31° C.), and polypropionaldehyde (Tc=−31° C.). Those compounds may be used either singly or in combination of two or more types.

The thermally decomposable resin is suitably selected depending on material composition applied to the layer, also in consideration of compatibility with a fine particle dispersant, a dispersing effect for the metal oxide particles, and a heating treatment temperature which is based on the substrate. For example, poly-δ-valerolactam, poly-γ-butyrolactam, and polytrichloroacetaldehyde are preferably used.

The thermally decomposable resin may be the one synthesized by a known method, or commercially available ones may be used. As for the polymerization method, for example, polylactams con be produced from the lactam as a raw material (e.g., γ-butyrolactam (2-pyrrolidone): manufactured by Nacalai Tesque) by ion polymerization in the presence of an alkyl or aryl alkali metal or coordination addition polymerization in the presence of metal alkoxide, or ring-opening polymerization in the presence of sulfonic acid. Further, polyaldehydes may be produced by polymerization of an aldehyde as a raw material (e.g., trichloroacetaldehyde hydrate (hydrous chloral): manufactured by SHOWA CHEMICAL Co., Ltd.) using a titanium complex or the like as a polymerization catalyst.

Considering the heat stability of a substrate, a ceiling temperature Tc of the thermally decomposable resin is preferably 80° C. or less, more preferably 70° C. or less, and still more preferably 60° C. or less. When Tc is higher than 80° C., depolymerization of the resin is insufficient during thermal decomposition treatment, and thus haze based on residual oligomers or the like may occur. Further, the lower limit of the ceiling temperature of the thermally decomposable resin is, from the viewpoint of suppressing the thermal decomposition of the thermally decomposable resin during formation of the precursor for the low refractive index layer and forming a micro domain, preferably −50° C. or higher, more preferably −45° C. or higher, said still more preferably 0° C. or higher. Meanwhile, the thermally decomposable resin is thermally decomposed into a monomer and dissipated (evaporated) during the heating process described below, and during the heating process, the precursor for the low refractive index layer which is formed by coating the coating liquid for the low refractive index layer, the precursor for the high refractive index layer which is formed by coating the coating liquid for the high refractive index layer, and the substrate are also heated. For such reasons, it is preferable to select the ceiling temperature that is lower than the softening temperature of the substrate and the binder in order to maintain the film shape during the heating process.

The weight average molecular weight of the thermally decomposable resin used in the present invention is preferably 500 to 1000000, more preferably 500 to 100000, and still more preferably 500 to 10000. When the weight average molecular weight of the thermally decomposable resin is within the above range, thermal decomposition occurs efficiently, and thus the pores can be easily formed. Meanwhile, in the present specification, the weight average molecular weight is defined as the molecular weight in terms of polystyrene which is measured by GPC analyzer using the columns of TSKgel GMHxL, TSKgel G4000HxL, or TSKgel G2000HxL (all manufactured by TOSOH CORPORATION), THF as a solvent, and a refractive index detection.

Meanwhile, although the thermally decomposable resin may be added by itself to the coating liquid for the low refractive index layer, because it is preferable that the thermally decomposable resin is evenly dispersed in the coating liquid for the low refractive index layer, the dispersion in which the thermally decomposable resin is dispersed in a solvent is preferably added to the coating liquid for the low refractive index layer. The preferred method for dispersing the thermally decomposable resin in a solvent is, although not particularly limited, to emulsify it by using a mixer or the like.

Examples of the solvent for dispersion include water, alcohols such as methanol, ethanol, 2-propanol, or 1-butanol, ethyl acetate, butyl acetate, isobutyl acetate, or ethyl propionate, toluene, hexane, acetone, chloroform, or methylene dichloride. Among them, water or a mixture system of water and an organic solvent is preferable. Water is more preferable. Further, the organic solvent may be used either singly or as a mixture of two or more types.

When the thermally decomposable resin is dispersed in water, by dissolving first the thermally decomposable resin in an organic solvent, mixing and emulsifying the organic solvent with water, and removing the organic solvent under reduced pressure, an aqueous dispersion in which the thermally decomposable resin is evenly dispersed can be obtained. At that time, the thermally decomposable resin is contained preferably at 1 to 40% by mass, more preferably at 3 to 30% by mass in the aqueous dispersion. Further, the amount of the organic solvent contained in the aqueous dispersion of the thermally decomposable resin is, when a water soluble polymer is used as a binder, as small as possible to maintain the uniformity of the coating liquid for the low refractive index layer. For example, it is preferably 0.0001 to 1% by mass.

For mixing and emulsifying the organic solvent containing the thermally decomposable resin with water, a surface active agent, an emulsion dispersant or the like may be used. The surface active agent and emulsion dispersant that are used are not particularly limited. However, an anionic surface active agent is preferably used, for example. Examples of the anionic surface active agent include an alkali metal salt (sodium, potassium, or the like) of a compound of a carboxylic acid type such as a fatty acid, rosin, or cholic acid, sulfonic acid type such as alkyl benzene sulfonic acid, and a phosphoric acid type like monoalkyl phosphoric acid. The use amount of the surface active agent and emulsion dispersant is preferably 0.5 to 50% by mass of the thermally decomposable resin. Further, a temperature for the mixing and emulsification is, although not particularly limited, preferably 20 to 65° C. As for the condition for emulsification, a known method can be used. However, a method of emulsifying the organic solvent containing the thermally decomposable resin and water containing the surface active agent and adding additionally water is preferable. The particle diameter (volume average particle diameter) of the thermally decomposable resin in the dispersion is, for example, preferably 10 to 500 nm, more preferably 20 to 300 nm, still more preferably 20 to 200 nm, and particularly preferably 20 to 100 nm.

(Fine Particle Dispersant)

According to the present embodiment, it is preferable that the coating liquid for the low refractive index layer additionally contains fine particle dispersant. The fine particle dispersant secures microscopic compatibility and dispensability of the thermally decomposable resin, and thus when the low refractive index layer contains a fine particle dispersant, if becomes possible to form even pores inside the low refractive index layer so that base can be suppressed.

Examples of the fine particle dispersant include a water based polymer dispersant such as a polycarboxylic acid type, naphthalene sulfonic acid formalin condensate type, or polyethylene glycols, and a surface active agent type dispersant such as alkyl sulfonate type, quaternary ammonium type, or higher alcohol oxide type. They may be used either singly or in combination of two or more types.

An addition amount of the fine particle dispersant is preferably 0.001 to 5% by mass, and more preferably 0.01 to 1% by mass with respect to the metal oxide microparticles.

(Radical Generator)

According to the present embodiment, the coating liquid for the low refractive index layer may further contain a radical generator such as a thermal radical generator or a photo radical generator for efficient decomposition of the thermally decomposable resin by heating treatment. By containing a radical generator, radicals can be generated in the precursor for the low refractive index layer so that the depolymerization reaction of the resin can be promoted. When the radical generator which is used is a photo radical generator, radicals can be generated by irradiation with active energy rays like UV during the heating treatment of the layer. When it is a thermal radical generator, by forming the layer using a generator which has a 10-hour half time temperature lower than Tc, the radicals can be efficiently generated during the heating treatment so that the resin can be decomposed in shorter time, and therefore it is preferable.

As for the thermal radical generator used in the present invention, an azo compound such as 2,2'-azobisisobutyronitrile, 2,2'-azobis(2,4-dimethylvaleronitrile), or 2,2'-azobis(4-methoxy-2,4-dimethylvaleronitrile) and an organic peroxide such as benzoyl peroxide, lauroyl peroxide, t-butyl peroxypyvalate, t-butyl peroxy-2-ethylhexanoate, or 1,1'-bis(t-butylperoxy)cyclohexane are preferably used.

Examples of the photo radical generator used in the present invention include 1-hydroxycyclohexylphenyl-ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthoxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide, 2-benzyl-2-dimethylamino-1-(4-morpholinophenyl)butan-1-one, and 1-[4-(2-hydroxyethoxy)-phenyl]-2-hydroxy-2-methyl-1-propan-1-one.

The radical generator may be used either singly or in combination of two or more types.

An addition amount of the radical generator is preferably 0.001 to 0.1% by mass, and more preferably 0.005 to 0.05% by mass with respect to the thermally decomposable resin.

[Method for Producing Infrared Shielding Film]

The method for producing the infrared shielding film of the present invention is not particularly limited. If at least one unit consisting of the high refractive index layer and the low refractive index layer can be formed on a substrate, any method can be used.

First, the coating liquid (coating liquid for the high refractive index layer and the coating liquid for the low refractive index layer) is prepared. Solvent for preparing the coating liquid for the high refractive index layer and the coating liquid for the low refractive index layer is, although not particularly limited, preferably water, an organic solvent, ca a mixture solvent thereof.

As for the organic solvent, an organic solvent with boiling point of 30 to 150° C. can be mentioned. Examples of the organic solvent include alcohols such as methanol, ethanol, 2-propanol, or 1-butanol, esters such as ethyl acetate, butyl acetate, ispbutyl acetate, ethyl propionate, ethylene glycol monomethyl ether acetate, propylene glycol monontethyl ether acetate, or propylene glycol monoethyl ether acetate, ethers such as diethyl ether, propylene glycol monomethyl ether, ethylene glycol monomethyl ether, or ethylene glycol monoethyl ether, amides such as dimethyl formamide or N-methyl pyrrolidone, and ketones such, as acetone methyl ethyl ketone, methyl isobutyl ketone, acetylacetone, or cyclohexanone. The organic solvent may be used either singly or as a mixture of two or more types.

From the viewpoint of environment and easy operability or the like, as a solvent for the coating liquid, water, and a mixture solvent consisting of water and an organic solvent soluble in water are preferable. In particular, water, and a mixture solvent of water and methanol, ethanol, or ethyl acetate are preferable.

With regard to each constitutional component for the coating liquid for the high refractive index layer and the coating liquid for the low refractive index layer, the concentration in the coating liquid is suitably determined such that the love refractive index layer and the high refractive index layer contain each component in desired amount. For example, the concentration of the binder in the coating liquid for the high refractive index layer is preferably 1 to 10% by mass. Further, the concentration of the metal oxide particles in the coating liquid for the high refractive index layer is preferably 1 to 50% by mass. Further, the concentration of the binder in the coating liquid for the low refractive index layer is preferably 1 to 10% by mass. Further, the concentration of the metal oxide particles in the coating liquid for the low refractive index layer is preferably 1 to 50% by mass. Further, when the coating liquid for the low refractive index layer contains a thermally decomposable resin, the concentration of the thermally decomposable resin is preferably 0.1 to 10% by mass.

In the present invention, at least one of the binders (a) to (c) described above is contained in a coating liquid for forming at least one layer of the high refractive index layer and the low refractive index layer. The preferred addition amount thereof is suitably adjusted within the binder concentration described above, considering the content in the high refractive index layer or the low refractive index layer that is finally formed.

The method for producing the coating liquid for the high refractive index layer and the coating liquid for the low refractive index layer is not particularly limited, and they are produced by a known method. For example, as for the coating liquid for the low refractive index layer, there is a method of adding metal oxide particles, a binder, and a thermally decomposable resin, which is added if needed, and other additives to a solvent and mixing them by stirring. At that time, the addition order for each component is not particularly limited. While stirring, each component may be added sequentially followed by mixing, or added all at once under stirring followed by mixing. If necessary, it is adjusted to suitable viscosity by additionally using a solvent. Meanwhile, as for the metal oxide particles and thermally decomposable resin, those separately prepared in dispersion state before producing the coating liquid are preferably used. When a dispersion is used, the dispersion is suitably added such that they can have a certain concentration in each layer.

Further, as for the coating liquid for the low refractive index layer and the coating liquid for the high refractive index layer, from the viewpoint of suppressing interlayer mixing by setting the coating film after coating, it is preferable to use a water based coating liquid which contains, as a main component, a water soluble resin such as polyvinyl alcohol resin, gelatins, or thickening polysaccharides, water, or a water based solvent containing water soluble organic solvent.

Further, it is preferable to form the high refractive index layer by using a water cased coating solution for the high refractive index layer, which is prepared by adding and dispersing rutile type titanium oxide with a volume average particle diameter of 100 nm or less. At that time, as for the rutile type titanium oxide, it is preferable to add water based titanium oxide sol, which has a pH of 1.0 to 3.0 and positive zeta potential of titanium particles, to the coating liquid for the high refractive index for preparation.

Further, for the simultaneous multilayer coating, in order to form a layer without mixing of the coating liquid for the high refractive index layer and the coating liquid for the low refractive index layer except at extreme interface, it is preferable that a water based coating liquid is used for both the coating liquid for the high refractive index layer and the coating liquid for the low refractive index layer. For such reason, a water soluble polymer is used as a binder for both the high refractive index layer and the low refractive index layer, and with regard to the composition of the coating liquid, the mass ratio between the water soluble polymer (binder) and metal oxide particles (water soluble polymer/metal oxide particles) is preferably in the range of 0.3 to 10, and more preferably 0.5 to 5.

For performing the simultaneous multilayer coating, the viscosity of the coating liquid for the high refractive index layer and the coating liquid for the low refractive index layer is preferably in the range of 5 to 100 mPa·s, and more preferably 10 to 50 mPa·s when a slide bead coating method is used. When a curtain costing method is used, it is preferably in the range of 5 to 1200 mPa·s, and more preferably in the range of at to 500 mPa·s.

Further, the viscosity at 15° C. of the coating liquid is preferably 100 mPa·s or higher, 100 to 30,000 mPa·s, more preferably 3,000 to 30,000 mPa·s, and more preferably 10,000 to 30,000 mPa·s.

According to the method for producing an infrared shielding film of the present invention, a unit consisting of the high refractive index layer and the low refractive index layer is laminated on a substrate. Specifically, it is preferable that the laminate is formed by coating and drying by turns the high refractive index layer and the low refractive index layer. Specifically, the following embodiments can be mentioned;

(1) a method of forming the infrared shielding film by coating and drying the coating liquid for the high refractive index layer on top of a substrate to form the high refractive index layer, and coating and drying the coating liquid for the low refractive index layer to form the low refractive index layer; (2) a method of forming the infrared shielding film by coating and drying the coating liquid for the low refractive index layer on top of a substrate to form the low refractive index layer, and coating and drying the coating liquid for the high refractive index layer to form the high refractive index layer; (3) a method of forming the infrared shielding film having the high refractive index layer and the low refractive index layer by performing successive multilayer coating of the coating liquid for the high refractive index layer and the coating liquid for the low refractive index layer by turns on top of a substrate and drying them; and (4) a method of forming the infrared shielding film having the high refractive index layer and the low refractive index layer by performing a simultaneous multilayer coating of the coating liquid for the high refractive index layer and the coating liquid for the low refractive index layer and drying them; or the like. Among them, the method (4) is preferable because the production process is simpler than other methods. Further, for an embodiment of using a thermally decomposable resin, it is preferable that the coating liquid for forming a precursor for the high refractive index layer and the coating liquid for forming a precursor for the low refractive index layer resin are used for a simultaneous multilayer coating, and then the coating film is set and dried.

Coating is performed such that the coating thickness of the coating liquid for the high refractive index layer and the coating liquid for the low refractive index layer becomes the preferred thickness after drying which is described above.

Examples of the coating method include, although not particularly limited, a roll coating method, a rod bar coating method, an air knife coating method, a spray coating method, a slide type curtain coating method, and a slide hopper (slide bead) coating method described in U.S. Pat. No. 2,761,419 and U.S. Pat. No. 2,761,791, or the like, and an extrusion coating method.

Further, as for the coating method for performing the simultaneous multilayer coating, an extrusion coating method, a slide hopper (slide bead) coating method, or a slide type curtain coating method is preferably used. The extrusion coating method is more preferable.

The condition for coating and drying is not particularly limited. For successive multilayer coating, any one of the coating liquid for the high refractive index layer and the coating liquid for the low refractive index layer, which has been heated to 30 to 60° C., is coated and dried on a substrate to form a layer, and the other coating liquid is coated and dried on the layer to form a precursor (unit) of the laminate film. Next, the unit in the number required expressing the desired infrared shielding performance is successively coated and dried according to the above method and laminated to obtain a laminate film precursor. For drying, it is preferable that the formed coating film is dried at a wet bulb temperature in the range of 5 to 50° C. and a film surface temperature an the range of 10 to 50° C. For example, drying is carried out by applying hot air at 40 to 60° C. for 1 to 5 seconds.

Further, as for the condition of coating and drying for performing a simultaneous multilayer coating, it is preferable that the coating liquid for the high refractive index layer and the coating liquid for the low refractive index layer are heated to 30 to 60° C., and then both the coating liquid for the high refractive index layer and the coating liquid for the low refractive index layer are used for the simultaneous multilayer coating on a substrate, the formed coating film is preferably first cooled to a temperature of 1 to 15° C. (setting), and then dried at 10° C. or higher. More preferred conditions for drying is a wet bulb temperature in the range of 5 to 50° C. and a film surface temperature in the range of 10 to 30° C. For example, drying is carried out by applying hot air at 80° C. for 1 to 5 seconds. With regard to the cooling mode immediately after the coating, it is preferable to perform it in horizontal set mode from the viewpoint of improving uniformity of the formed coating film.

As described herein, the setting means a process in which, by means of lowering temperature by applying cold aid or the like to the coating film, increases the viscosity of the coating film composition so that the fluidity or the materials in each interlayer in each layer is reduced or gellified. The state in which, when cold air is applied onto the surface of the coating film and the surface of the coating film is pressed with a finger, nothing sticks to the finger, is defined as a complete setting.

The time period from the coating to complete setting by applying cold air (setting time) is preferably 5 min or less. More preferably, it is 2 min or less. Further, although the lower limit of the time period is not particularly limited, it is preferable to have a time period of at least 45 sec. When the setting time is too short, mixing of the components in the layer may become insufficient. On the other hand, when the setting time is too long, the interlayer diffusion of the metal oxide particles is promoted so that the difference in refractive index between the high refractive index layer and the low refractive index layer may become insufficient. Meanwhile, if high elasticity of an intermediate layer between the high refractive index layer and the low refractive index layer occurs fast, it is not necessary to have the setting step.

For adjusting the setting time, the concentration of the water soluble polymer (binder) or the concentration of the metal oxide particles can be adjusted, or adjustment can be made by adding other components like various known gelling agents such as gelatin, pectin, agar, carrageenan, or gellan gum.

The temperature of the cold air is preferably 0 to 25° C., and more preferably 5 to 10° C. Further, the time for exposure of the coating film to cold air is preferably 10 to 120 sec, although it may vary depending on delivery speed of the coating film.

In an embodiment in which the low refractive index layer contains the thermally decomposable resin, the laminate film precursor containing the precursor for the high refractive index layer and precursor for the low refractive index layer which as obtained as described above is heated.

As described above, the laminate film precursor contains the metal oxide particles and thermally decomposable resin in the precursor for the low refractive index layer. By heating the laminate film precursor, the thermally decomposable resin contained in the precursor for the low refractive index layer is decomposed into a monomer, which is dissipated (evaporated) by heat to form pores, and thus a laminate film having the low refractive index layer and the high refractive index layer is completed.

In other words, as the pores are formed by heating of the low refractive index layer which forms the laminate film, the low refractive index layer will have a low refractive index. In a coating method, of either a successive coating or a simultaneous multilayer coating, an obtained laminate film precursor is heated to have thermally decomposable resin contained in the precursor for the low refractive index layer decomposed by heat and dissipated to form pores, and the low refractive index layer is allowed to have low refractive index. According to this process, the refractive index of the low refractive index layer is reduced so that the difference in refractive index from the nice refractive index layer increases, and therefore reduction of the lamination number can be achieved.

At that time, if the laminate film precursor is formed by a simultaneous multilayer coating, the drying and shrinkage stress occurring between adjacent layers during drying is reduced so that the inter layer peeling can be suppressed. In addition, also at the interlayer mixing part present in adjacent layers, pores based on decomposition of the thermally decomposable resin are formed. Thus, the difference in refractive index between the high refractive index layer and the low refractive index layer increases and the infrared reflection efficiency can be further enhanced.

It is sufficient that the temperature for heating the laminate film precursor is equal to or higher than Tc of the thermally decomposable resin. Further, to maintain the film shape, it is preferable to perform the heating at the temperature which is lower than the softening point of the substrate and the binder. When no binder is contained in each layer, it is equal to or higher than Tc of the thermally decomposable resin but lower than the softening point of the substrate. When the binder is contained, it is equal to or higher than Tc but lower than the softening point or the substrate and the binder. Specifically, the temperature for heating the laminate film precursor is preferably 80° C. or lower, more preferably 30 to 80° C., still more preferably 40 to 70° C., and particularly preferably 50 to 70° C. Meanwhile, even when Tc of the thermally decomposable resin is lower than room temperature (25° C.), as the reactivity is low before heating, it is difficult for the thermally decomposable resin to have the decomposition reaction. However, by heating, the thermal decomposition reaction is promoted. Further, when a radical generator for promoting thermal decomposition of the thermally decomposable resin is contained in the precursor for the low refractive index layer, the temperature for heating the laminate film precursor as preferably 40 to 75° C., although it is not limited if the 10-hour half time temperature of the radical generator is Tc or lower.

The method for heating the laminate film is not particularly limited, if it allows heating of the laminate film. However, the heating is preferably carried out by standing the film in an incubator set at any temperature preferably for 30 min to 6 hours, and more preferably 1 to 4 hours such that the film surface temperature becomes 80° C. or higher.

According to this embodiment, the infrared shielding film is obtained by subjecting the laminate film precursor to a heating treatment. The low refractive index layer of the obtained infrared shielding film has pores that are formed by evaporation of monomers derived from thermal decomposition of the thermally decomposable resin. As described herein, "pores" indicates a portion in which gas like air or vacuum space is present. Meanwhile, although the pores are created by heating of the precursor for the low refractive index layer, there is no limit whether or not the entire monomer generated by thermal decomposition is evaporated, and the proportion of thermal decomposition of the thermally decomposable resin is not particularly limited, either. Further, during the process of thermal decomposition of thermally decomposable resin of the present invention, not only the monomer but also the oligomer may be present as a depolymerized component of the thermally decomposable a resin. Specifically, in the low refractive index layers the thermally decomposable resin, an oligomer generated by thermal decomposition, and a monomer generated by thermal decomposition may be present.

According so the embodiment, the pores formed in the low refractive index layer preferably has an average pore diameter of 3 to 80 nm. More preferably, it is 3 to 60 nm, and still more preferably 3 to 50 nm. Meanwhile, according to TEM measurement of the low refractive index layer, the pores generated by heating treatment can be confirmed as a circle pore, an oval pore, or a substantially circle or oval pore. Meanwhile, the pore diameter of the pore means the minimum distance among the distances between two parallel lanes tangent to the outlines of the diameter of a pore, which is observed to be cyclic, oval, or substantially cyclic or oval, and the average pore diameter is obtained by observing randomly 50 or more observable pore diameters to obtain pore diameters for each particle and the number average of them. In addition, the pores formed in the low refractive index layer depend on the designed refractive index value of the a low refractive index layer, and it can be controlled by an addition amount of the thermally decomposable resin (=amount of formed pores). In addition, by controlling the amount of formed pores (pore volume) depending on the content of the thermally decomposable resin in the coating liquid for the low refractive index layer, the reduction degree of the refractive index of the obtained low refractive index layer can be controlled.

The thermally decomposable resin becomes a monomer upon heating, and the monomer is lost by evaporation. However, the thermally decomposable resin in the precursor for the low refractive index layer (a layer corresponding to the low refractive index layer before heating) is preferably 0.01 to 15% by mass of the total mass of the precursor for the low refractive index layer (solid content mass). More preferably, it is 0.1 to 10% by mass. Further, the thermally decomposable resin remaining in the low refractive index layer is preferably less than 5% of the thermally decomposable resin used.

[Infrared Shield]

The infrared shielding film of the present invention is applicable to a wide range of fields. For example, it is adhered to the equipment exposed to sunlight for a long period such as an outdoor window of the building or the car window, and it is used as a film for windowpane such as an infrared shielding film which gives the infrared shielding effect or a film for vinyl houses for agriculture mainly for enhancing weather resistance.

The infrared shielding film of the present invention is particularly preferably used for a member which is adhered to a glass or a substrate such as a resin alternative to the glass either directly or via adhesives.

In other words, according to another embodiment of the present invention, an infrared shielding body in which the infrared shielding film of the present invention is formed on at least one surface of the substrate is also provided.

Specific examples of the substrate include glass, polycarbonate resin, polysulfone resin, acryl resin, polyolefin resin, polyether resin, polyester resin, polyamide resin, polysulfide resin, unsaturated polyester resin, epoxy resin, melamine resin, phenol resin, diallyl phthalate resin, polyimide resin, urethane resin, polyvinyl acetate resin, polyvinyl alcohol resin, styrene resin, vinyl chloride resin, metal plate, and ceramics. The type of the resin may be any one of a thermoplastic resin, thermocuring resin, an ionizing radiation curing rein, and it may be used in combination of two or more types. The substrate which may be used in the present invention can be produced by a known method such, as extrusion molding, calendar molding, injection molding, hollow molding, or compression molding. The thickness of the substrate is, although not particularly limited, generally from 0.1 mm to 5 cm.

The adhesion layer or adhesive layer for adhesion of the infrared shielding film to a substrate is preferably placed such that the infrared shielding film is in the incidence plane side of sunlight (heat ray). Moreover, it is preferable to sandwich the infrared shielding film of the present invention between a windowpane and a substrate, since it can be sealed from environmental gas such as moisture and can have excellent durability. The infrared shielding film of the present invention can be preferably installed in the outdoors or the outside of car (as outdoor application) in terms of environmental durability.

As for the adhesives which may be used in the present invention, the adhesives containing a photo curable or heat curable resin as a main component can be used.

As for the adhesives, it is preferable to have resistance to UV rays, and acryl based adhesives or silicone a based adhesives are preferable. Furthermore, in view of adhesion characteristics or cost, it is preferably acryl based adhesives. Since it is easy to control a peeling strength, the solvent based acryl adhesives are mere preferable. In the case of using solution polymerization polymer as solvent based acryl adhesives, well-known ones can be used as a monomer thereof.

Moreover, polyvinyl butyral based resin used as the intermediate layer in the laminated glass, or ethylene vinyl acetate copolymer based resin can be used. Specific examples thereof include plastic polyvinyl butyral (manufactured by Sekisui Chemical Co., Ltd. or Mitsubishi Monsanto Co.), ethylene-vinyl acetate copolymer (manufactured by Du Pont, Takeda Pharmaceutical Company, Ltd., Duramine), and modified ethylene vinyl acetate copolymer (manufactured by TOSOH CORP., Melthene G). In addition, an ultraviolet absorption agent, an anti-oxidizing agent, an antistatic agent, a heat stabilizer, a lubricant, a filler, a colorant, and an adhesion adjustment agent may be added suitably to the adhesive layer.

The heat insulating performance and solar heat shielding performance of an infrared shielding film or an infrared shielding body can be generally obtained by the methods based on JIS R 3209 (double layer glass), JIS R 3106 (test method for transmittance, reflectance, emissivity, solar heat uptake ratio of plate glasses), and JIS R 3107 (method for calculating heat resistance of plate glasses and thermal transmittance in building).

With regard to the measurement of the solar transmittance, solar reflectance, emissivity, and the visible light transmittance, (1) spectrophotometric transmittance and spectrophotometric reflectance of various single glasses are measured using a spectrophotometric light measuring device with a wavelength of 300 to 2500 nm. Further, by using a spectrophotometric light measuring device with a wavelength of 5.5 to 50 μm, the emissivity is measured. Meanwhile, as for the emissivity of a float plate glass, a polished plate glass, a template plate glass, and heat ray-absorbing plate glass, previously determined values are used. (2) With regard to calculation of solar transmittance, solar reflectance, solar absorbance, and corrected emissivity, solar transmittance, solar reflectance, solar absorbance, and normal emissivity are calculated according to JIS R 3106. The correct emissivity is obtained by multiplying the normal emissivity by the constant shown in JIS R 3107. For calculation of the heat insulating property and solar heat shielding property, (1) heat resistance of a multiple layer glass is calculated according to JIS R 3209 by using the measured thickness value and corrected emissivity. However, when the hollow layer is more than 2 mm, the gas heat conductance of the hollow layer is obtained according to JIS R 3107. (2) Heat insulating property is obtained as heat transmission resistance by adding the heat transfer resistance to the heat resistance of a multiple layer glass. (3) Solar heat shielding property is calculated by obtaining solar heat uptake ratio according to JIS R 3106 and subtracting the result from 1.

EXAMPLES

Hereinafter, although the present invention will be described in more detail in view of the Examples, the present invention is not limited to these Examples. Meanwhile, the expression of "part" or "%" referred to in Examples represents "part by mass" or "% by mass", unless otherwise specified.

Example 1-1

Preparation of Coating Liquid

[Preparation of Coating Liquid for Low Refractive Index Layer]
(Preparation of Coating Liquid 1-1 for Low Refractive Index Layer)

To 215 g of 10% by mass aqueous colloidal silica dispersion, 330 g of 5.0% by mass aqueous solution of acid-treated gelatin at 45° C. and 127 g of 1.0% by mass aqueous solution of hydroxyethyl cellulose (HEC) were slowly added and mixed under stirring. Subsequently, as a surface active agent, 2.66 g of 5.0% by mass aqueous solution of Nissan Cation 2-DB-500E (cationic surface active agent, didecyldimethyl-ammonium, chloride, manufactured by NOF Corporation) was added and finished with 650 mL of pure water at 45° C. to prepare the coating liquid 1-1 for the low refractive index layer.

(Preparation of Coating Liquid 1-2 for Low Refractive Index Layer)

The coating liquid 1-2 for the low refractive index layer was prepared in the same manner as the preparation of the coating liquid 1-1 for the low refractive index layer except that 355 g of 5.0% by mass aqueous polyvinyl alcohol solution (that is, 1:1 (mass ratio) mixture liquid of PVA203 and PVA217) was used instead of 5.0% by mass aqueous solution of acid-treated gelatin and 1.0% by mass aqueous solution of hydroxyethyl cellulose.

PVA203: Kuraray POVAL 203, polyvinyl alcohol, polymerization degree: 300, manufactured by Kuraray Co., Ltd.

PVA217: Kuraray POVAL 217, polyvinyl alcohol, polymerization degree: 1700, manufactured by Kuraray Co., Ltd.

(Preparation of Coating Liquids 1-3 to 1-14 for Low Refractive Index Layer)

The coating liquids 1-3 to 1-14 for the low refractive index layer were prepared in the same manner as the preparation of the coating liquid 1-2 for the low refractive index layer except that the carboxyvinyl polymer was added according to the types and addition amount listed in Table 1. Meanwhile, depending on an addition amount of each additive, the amount of pure water was appropriately adjusted and the total amount of the coating liquid was adjusted to be equal to the amount of the coating liquid 1-2 for the low refractive index layer. The addition amount of carboxyvinyl polymer listed in Table 1 is expressed in % by mass with respect to the polyvinyl alcohol as a binder.

TABLE 1

| Number of coating liquid for low refractive index layer | Carboxyvinyl polymer Type | Carboxyvinyl polymer Addition amount(*1) | Physical properties of coating film pH | Physical properties of coating film Viscosity (mN/m) |
|---|---|---|---|---|
| 1-1 | — | — | 4.0 | 10 |
| 1-2 | — | — | 4.0 | 12 |
| 1-3 | CP940 | 0.1 | 4.0 | 22 |
| 1-4 | CP940 | 0.5 | 4.0 | 39 |
| 1-5 | CP940 | 1.0 | 4.0 | 45 |
| 1-6 | CP940 | 2.0 | 4.0 | 51 |
| 1-7 | CP940 | 4.0 | 4.0 | 53 |
| 1-8 | CP940 | 6.0 | 4.0 | 58 |
| 1-9 | HVW105 | 0.1 | 4.0 | 25 |
| 1-10 | HVW105 | 0.5 | 4.0 | 40 |
| 1-11 | HVW105 | 1.0 | 4.0 | 46 |
| 1-12 | HVW105 | 2.0 | 4.0 | 53 |
| 1-13 | HVW105 | 4.0 | 4.0 | 55 |
| 1-14 | HVW105 | 6.0 | 4.0 | 58 |

(*1): % by mass with respect to the total binder amount

[Preparation of Coating Liquid for High Refractive Index Layer]

(Preparation of Coating Liquid 1-1 for High Refractive Index Layer)

To 15.2 g of 20.0% by mass titanium oxide sol (volume average particle diameter of 35 nm, rutile type titanium oxide particles), 225 g of 5.0% by mass aqueous solution of acid-treated gelatin was slowly added and mixed under stirring. Subsequently, as a surface active agent, 0.43 g of 5.0% by mass aqueous solution of 2-DB-500E (as described above, manufactured by NOF Corporation) was added and finished with 450 mL of pure water to prepare the coating liquid 1-1 for the high refractive index layer.

(Preparation of Coating Liquid 1-2 for High Refractive Index Layer)

The coating liquid 1-2 for the high refractive index layer was prepared in the same manner as the preparation of the coating liquid 1-1 for the high refractive index layer except that a mixture of polyvinyl alcohol and collagen peptide (1:2.5 (mass ratio) mixture of PVA217 and collagen peptide) in the same solid content was used instead of the aqueous solution of acid-treated gelatin.

(Preparation of Coating Liquid 1-3 for High Refractive Index Layer)

The coating liquid 1-3 for the high refractive index layer was prepared in the same manner as the preparation of the coating liquid 1-2 for the high refractive index layer except that locust bean gum was added as an aqueous solution such that it was 5.0% by mass with respect to the total solid content 100% by mass of the mixture of polyvinyl alcohol and collagen peptide.

(Preparation of Coating Liquids 1-4 to 1-15 for High Refractive Index Layer)

The coating liquids 1-4 to 1-15 for the high refractive index layer were prepared in the same manner as the preparation of the coating liquid 1-2 for the high refractive index layer except that the carboxyvinyl polymer of the present invention or other additives (thickening polysaccharides) are added according to the condition listed in Table 2. Meanwhile, depending on the addition amount of each additive, the amount of pure water was appropriately adjusted and the total amount of the coating liquid was adjusted to be equal to the amount of the coating liquid 1-2 for the high refractive index layer. The addition amount of carboxyvinyl polymer listed in Table 2 is expressed in % by mass with respect to the polyvinyl alcohol as a binder.

TABLE 2

| Number of coating liquid for high refractive index layer | Carboxyvinyl polymer Type | Carboxyvinyl polymer Addition amount (*1) | Other additives Type | Other additives Addition amount (*1) | Physical properties of coating film pH | Physical properties of coating film Viscosity (mN/m) |
|---|---|---|---|---|---|---|
| 1-1 | — | — | — | — | 2.8 | 9 |
| 1-2 | — | — | — | — | 3.0 | 6 |
| 1-3 | — | — | Locust bean gum | 5.0 | 3.0 | 10 |
| 1-4 | CP940 | 0.5 | — | — | 3.0 | 30 |
| 1-5 | CP940 | 1.0 | — | — | 3.0 | 37 |
| 1-6 | CP940 | 1.0 | Locust bean gum | 5.0 | 3.0 | 42 |
| 1-7 | CP940 | 2.0 | — | — | 3.0 | 46 |
| 1-8 | CP940 | 4.0 | — | — | 3.0 | 49 |
| 1-9 | HVW105 | 0.5 | — | — | 3.0 | 33 |
| 1-10 | HVW105 | 1.0 | — | — | 3.0 | 40 |
| 1-11 | HVW105 | 1.0 | Tamarind seed gum | 5.0 | 3.0 | 43 |
| 1-12 | HVW105 | 1.0 | Locust bean gum | 5.0 | 3.0 | 47 |
| 1-13 | HVW105 | 2.0 | — | — | 3.0 | 51 |
| 1-14 | HVW105 | 4.0 | — | — | 3.0 | 53 |
| 1-15 | HVW105 | 6.0 | — | — | 3.0 | 54 |

(*1): % by mass with respect to the total binder amount

Meanwhile, pHs listed in Tables 1 and 2 were measured as pH at 45° C. by using, as a pH meter, digital pH meter HM-30S manufactured by DKK-TOA CORPORATION. Further, with regard to viscosity, viscosity (mN/m) of a coating liquid at 45° C. was measured by using B type viscometer BL manufactured by TOKYO KEIKI INC.

Meanwhile, details of each additive described with an abbreviation in Tables 1 and 2 are as follows.

<Carboxyvinyl Polymer According to Present Invention>

CP940: CARBOPOL 940 (manufactured by B. F. Goodrich Company, polyallyl pentaerythritol, weight average molecular weight of 4000000)

HVW105: HIBISWAKO 105 (manufactured by Wako Pure Chemical Industries, Ltd.)

All of the above carboxyvinyl polymers are carboxyvinyl polymer which has a monomer component containing a carboxylic acid in an amount of 20 to 75% by mass of the total composition.

<<Production of Infrared Shielding Film>>

[Production of Infrared Shielding Film 1-1]

By using a slide hopper coating apparatus which can be used for 16-layer multilayer coating, the coating liquid 1-1 for the low refractive index layer and the coating liquid 1-1 for the high refractive index layer under heating at 45° C. as prepared above were coated by turns, each in 8 layers, on a polyethylene terephthalate film with a thickness of 50 μm (A4300 manufactured by Toyobo Co., Ltd.; easy adhesion layer on both surfaces), which has been heated to 45° C., such that a thickness of each low refractive index layer was 180 nm and s thickness of each high refractive index layer was 130 nm after drying, that is, the total 16 layers were formed by a simultaneous multilayer coating at tee rate to 100 m per minute. Right after the coating, cold air at 5° C. was applied for setting. At that time, the time until nothing sticks to the finger even after the surface was touched by a finger (that is, setting time) was 5 min. Upon the completion of the setting, it was applied with hot air at 30° C. for drying to produce the infrared shielding film 1-1.

[Production of Infrared Shielding Films 1-2 to 1-18]

The Infrared Shielding Films 1-2 to 1-18 were produced in the same manner as the production of the infrared shielding film 1-1 except that each of the coating liquids 1-2 to 1-14 for the low refractive index layer and the coating liquid for the high refractive index layers 1-2 to 1-12 listed in Table 3 are used instead of the coating liquid 1-1 for the low refractive index layer and the coating liquid 1-1 for the high refractive index layer.

<<Evaluation of Infrared Shielding Film>>

Measurements of the following characteristic values and evaluation of the performances were carried out for each infrared shielding film produced in the above.

[Evaluation of Coating Uniformity]

For the production of each infrared shielding film, characteristics of the coating film on slide hopper surface during coating and film surface state of each sample after coating were visually observed, and coating uniformity was evaluated according to the following criteria.

○: The coating liquid dripping down the slide hopper surface shows a uniform liquid surface without having disturbances in the liquid, and the surface of the formed infrared shielding film is also uniform.

Δ: Although slight disturbances in the liquid was observed for the coating liquid dripping down the slide hopper surface, the surface of the formed infrared shielding film was almost uniform so that it corresponds to practically acceptable quality.

X: Huge disturbances in the liquid was observed for the coating liquid dripping down the slide hopper surface and the surface of the formed infrared shielding film was not uniform so that it corresponds to practically unacceptable quality.

[Evaluation of Interlayer Separation]

Cross section of each infrared shielding film produced above was analyzed by elemental measurement using energy scattering type fluorescence X ray analyzer. After observing presence distribution of Si and Ti, the interlayer separation during coating was evaluated according to the following criteria.

○: Presence distribution of Si and Ti is clearly separated between the low refractive index layer and the high refractive index layer and no interlayer disturbances are observed, and thus interlayer uniformity is excellent.

Δ: Although slight disturbances in the presence distribution of Si and Ti is observed between the low refractive index layer and the high refractive index layer, but overall the interlayer characteristics are almost favorable.

X: Huge disturbances in the presence distribution of Si and Ti are observed between the low refractive index layer and the high refractive index layer, and the interlayer separation is poor.

[Measurement of Refractive Index of Low Refractive Index Layer and High Refractive Index Layer]

A sample for measurement is prepared by single-layer coating of each of the coating liquid for the low refractive index layer and the coating liquid for the high refractive index layer on a substrate under the same condition as the production of the infrared shielding film, and the refractive index was measured by the following method for each of the high refractive index layer and the low refractive index layer.

After a roughing treatment was conducted on the back surface opposite to the measurement side of each sample, a light absorbing treatment was carried out using a black spray to prevent reflection from the back surface. Using a spectrophotometer U-4000 (manufactured by Hitachi Ltd.), the average reflectance in a visible light region (400 nm to 700 nm) was measured under 5 degree mirror reflection to obtain the refractive index.

[Measurement of Visible Light Transmittance and Infrared Transmittance]

By using the above spectrophotometer (U-4000, an integrating sphere was used, manufactured by Hitachi Ltd.), the light transmittance of each infrared shielding film was measured in the region of 300 nm to 2000 nm. The transmittance at 550 nm was used as a visible light transmittance, and it was used as an index of visible light transmitting property. In addition, the transmittance at 1200 nm was used as infrared transmittance, and it was used as an index of infrared reflecting property. The lower the infrared transmittance is, the higher the infrared reflectance it represents.

[Evaluation of Deviation in Optical Characteristics]

By using the above spectrophotometer (U-4000, an integrating sphere was used, manufactured by Hitachi Ltd.), measurement of transmittance at 550 nm and transmittance at 1200 nm were performed at twenty points, in which the points are away from each other at 1 mm interval, to obtain fluctuation coefficient of the obtained transmittance (that is, standard deviation/average value, %), and it was taken as an indicator of the deviation. The higher fluctuation coefficient indicates, the larger deviation in performances depending on the position, and if it was higher than 5.0%, it was determined as an area with a problem in product quality.

The evaluation results and measurement results obtained from the above are listed in Table 3.

TABLE 3

| Infrared shielding film number | Low refractive index layer | | High refractive index layer | | Coating quality | | Visible light transmitting property | | Infrared reflecting property | | Remarks |
|---|---|---|---|---|---|---|---|---|---|---|---|
| | Coating liquid number | Refractive index | Coating liquid number | Refractive index | Coating uniformity | Interlayer separation property | Visible light transmittance (%) | Fluctuation coefficient (%) (deviation) | Infrared transmittance (%) | Fluctuation coefficient (%) (deviation) | |
| 1-1 | 1-1 | 1.49 | 1-1 | 1.89 | ○ | X | 71 | 9.5 | 26 | 10.6 | Comparative Example |
| 1-2 | 1-2 | 1.49 | 1-2 | 1.89 | X | X | 72 | 10.5 | 23 | 10.1 | Comparative Example |
| 1-3 | 1-2 | 1.49 | 1-3 | 1.89 | X | Δ | 74 | 10.3 | 20 | 7.2 | Comparative Example |

TABLE 3-continued

| Infrared shielding film number | Low refractive index layer | | High refractive index layer | | Coating quality | | Visible light transmitting property | | Infrared reflecting property | | Remarks |
|---|---|---|---|---|---|---|---|---|---|---|---|
| | Coating liquid number | Refractive index | Coating liquid number | Refractive index | Coating uniformity | Interlayer separation property | Visible light transmittance (%) | Fluctuation coefficient (%) (deviation) | Infrared transmittance (%) | Fluctuation coefficient (%) (deviation) | |
| 1-4 | 1-3 | 1.49 | 1-4 | 1.89 | Δ | Δ | 81 | 4.1 | 17 | 4.5 | Present invention |
| 1-5 | 1-4 | 1.49 | 1-4 | 1.89 | ○ | ○ | 85 | 3.6 | 16 | 3.3 | Present invention |
| 1-6 | 1-5 | 1.49 | 1-5 | 1.89 | ○ | ○ | 87 | 3.4 | 13 | 3.2 | Present invention |
| 1-7 | 1-5 | 1.49 | 1-6 | 1.89 | ○ | ○ | 88 | 3.1 | 15 | 3.1 | Present invention |
| 1-8 | 1-6 | 1.49 | 1-7 | 1.89 | ○ | ○ | 87 | 3.5 | 17 | 3.5 | Present invention |
| 1-9 | 1-7 | 1.49 | 1-8 | 1.89 | ○ | ○ | 82 | 3.9 | 18 | 4.1 | Present invention |
| 1-10 | 1-8 | 1.49 | 1-8 | 1.89 | Δ | ○ | 81 | 4.6 | 19 | 4.3 | Present invention |
| 1-11 | 1-9 | 1.49 | 1-9 | 1.89 | Δ | Δ | 80 | 3.7 | 15 | 4.0 | Present invention |
| 1-12 | 1-10 | 1.49 | 1-9 | 1.89 | ○ | ○ | 82 | 3.5 | 18 | 3.6 | Present invention |
| 1-13 | 1-11 | 1.49 | 1-10 | 1.89 | ○ | ○ | 84 | 3.4 | 14 | 3.4 | Present invention |
| 1-14 | 1-11 | 1.49 | 1-11 | 1.89 | ○ | ○ | 84 | 3.3 | 13 | 3.2 | Present invention |
| 1-15 | 1-11 | 1.49 | 1-12 | 1.89 | ○ | ○ | 85 | 3.1 | 12 | 3.0 | Present invention |
| 1-16 | 1-12 | 1.49 | 1-13 | 1.89 | ○ | ○ | 83 | 3.4 | 14 | 3.3 | Present invention |
| 1-17 | 1-13 | 1.49 | 1-14 | 1.89 | ○ | ○ | 81 | 3.6 | 16 | 3.5 | Present invention |
| 1-18 | 1-14 | 1.49 | 1-15 | 1.89 | Δ | Δ | 80 | 3.8 | 17 | 4.0 | Present invention |

According to the result listed in Table 3, it was found that the infrared shielding film of the present invention in which the carboxyvinyl polymer according to the present invention was used can be produced by a coating method having excellent productivity, and as high infrared reflectance can be achieved without lowering the visible light transmittance and deviation in optical characteristics was small, the coating can be uniformly performed.

Example 1-2

Production of Infrared Shield

The infrared shielding films 1-1 to 1-10 produced in Example 1-1 was used for adhesion on a glass substrate via adhesives to produce the infrared shielding body 1-1 to 1-18.

<<Evaluation of Infrared Shielding Body>>

The infrared shielding body produced above was installed as a windowpane, and then infrared shielding property against light was evaluated. As a result, the infrared shielding bodies 1-4 to 1-18 show sufficient visible light transmission and have a high effect of shielding infrared rays compared to Comparative Examples, and thus they are confirmed to be a windowpane having an excellent energy saving property.

Example 2-1

Synthesis of Copolymer Having pH Dependency of Viscosity

According to the following method, copolymers VP-1 to VP-10 having pH dependency of viscosity which consist of a monomer having vinyl amide as a polymerization component and a monomer having a vinyl carboxylic acid were synthesized.

(Synthesis of Copolymer VP-1)

By using pentaerythritol triallyl ether (PETE) as a cross-linking agent and LUPEROX 11 (t-butyl-peroxypyvalate, manufactured by ARKEMA YOSHITOMI, LTD.) as a polymerization initiator 1, a copolymer consisting of N-vinylcaprolactam (VCL) as vinyl amide component and acrylic acid (AA) as a vinyl carboxylic acid component was polymerized according to the method of Examples 1 to 15 described in JP 2008-516950 to synthesize the copolymer PV-1 in which VCL/AA/PETE mass ratio was 50:50:1.5 and N-vinylcaprolactam (VCL) cross linked with pentaerythritol triallyl ether (PETE) was copolymerized with acrylic acid (AA).

(Synthesis of Copolymers VP-2 to VP-10)

Copolymers VP-2 to VP-10 were synthesized in the same manner as the above synthesis of copolymer VP-1 except that the type and constitutional ratio (mass ratio) of vinyl amide component, the type and constitutional ratio (mass ratio) of a vinyl carboxylic acid component, the type and constitutional ratio (mass ratio) of a cross linking agent, and type of a polymerization initiator are changed to the combination and mass ratio listed in Table 4.

TABLE 4

| Copolymer number | Vinyl amide component Type | Mass ratio | Vinyl carboxylic acid component Type | Mass ratio | Other components Type | Mass ratio | Cross linking agent component Type | Mass ratio | Type of polymerization initiator |
|---|---|---|---|---|---|---|---|---|---|
| VP-1 | VCL | 50 | AA | 50 | — | — | PETE | 1.5 | Polymerization initiator 1 |
| VP-2 | VCL | 70 | AA | 30 | — | — | PETE | 1.5 | Polymerization initiator 1 |
| VP-3 | VCL | 30 | AA | 70 | — | — | PETE | 1.5 | Polymerization initiator 1 |
| VP-4 | VCL | 50 | AA | 50 | — | — | PETE | 2.0 | Polymerization initiator 2 |
| VP-5 | VP | 50 | AA | 50 | — | — | PETE | 1.0 | Polymerization initiator 1 |
| VP-6 | VP | 70 | AA | 30 | — | — | PETE | 1.0 | Polymerization initiator 1 |
| VP-7 | VP | 30 | AA | 70 | — | — | PETE | 1.0 | Polymerization initiator 1 |
| VP-8 | VP | 50 | MAA | 50 | — | — | PETE | 1.0 | Polymerization initiator 1 |
| VP-9 | VP | 50 | AA | 50 | — | — | PETA | 1.0 | Polymerization initiator 1 |
| VP-10 | VP | 60 | AA | 25 | LM | 15 | PETE | 1.0 | Polymerization initiator 1 |

LM: Lauryl methacrylate

Meanwhile, details of each material described with abbreviations in Table 4 are as follows.
<Vinyl Amide Component>
 VCL: N-vinylcaprolactam
 VP: N-vinyl pyrrolidone
<Vinyl Carboxylic Acid Component>
 AA: Acrylic acid
 MAA: Methacrylic acid
<Cross Linking Agent>
 PETE: pentaerythritol triallyl ether
 PETA: pentaerythritol triacrylate
<Polymerization Initiator>
 Polymerization initiator 1: LUPEROX 11 (t-butyl-peroxypyvalate, manufactured by ARKEMA YOSHITOMI, LTD.)
 Polymerization initiator 2: LUPEROX 10 (t-butyl-peroxyneodecanoate, manufactured by ARKEMA YOSHITOMI, LTD.)
<<Preparation of Coating Liquid>>
[Preparation of Coating Liquid for Low Refractive Index Layer]
(Preparation of Coating Liquid 2-1 for Low Refractive Index Layer)
To 215 g of 10% by mass aqueous colloidal silica dispersion, 330 g of 5.0% by mass aqueous solution of acid-treated gelatin at 45° C. and 127 g of 1.0% by mass aqueous solution of hydroxyethyl cellulose (HEC) were slowly added and mixed under stirring. Subsequently, as a surface active agent, 2.66 g of 5.0% by mass aqueous solution of Nissan Cation 2-DB-500E (cationic surface active agent, didecyldimethyl-ammonium chloride, manufactured by NOF Corporation) was added and finished with 650 mL of pure water at 45° C. to prepare the coating liquid 2-1 for the low refractive index layer.
(Preparation of Coating Liquid 2-2 for Low Refractive Index Layer)
The coating liquid 2-2 for the low refractive index layer was prepared in the same manner as the preparation of the coating liquid 2-1 for the low refractive index layer except that 355 g of 5.0% by mass aqueous polyvinyl alcohol solution (that is, 1:1 (mass ratio) mixture liquid of PVA203 and PVA217) was used instead of 5.0% by mass aqueous solution of acid-treated gelatin and 1.0% by mass aqueous solution of hydroxyethyl cellulose.
PVA203: Kuraray POVAL 203, polyvinyl alcohol, polymerization degree: 300, manufactured by Kuraray Co., Ltd.
PVA217: Kuraray POVAL 217, polyvinyl alcohol, polymerization degree: 1700, manufactured by Kuraray Co., Ltd.
(Preparation of Coating Liquids 2-5 to 2-17 for Low Refractive Index Layer)
The coating liquids 2-3 to 2-17 for the low refractive index layer were prepared in the same manner as the preparation of the coating liquid 2-2 for the low refractive index layer except that the copolymer having pH dependency of viscosity of the present invention was added according to the condition listed in Table 5. Meanwhile, depending on the addition amount of each additive, the amount of pure water was appropriately adjusted and the total amount of the coating liquid was adjusted to be equal to the amount of the coating liquid 2-2 for the low refractive index layer. The addition amount of copolymer having pH dependency of viscosity listed in Table 5 is expressed in % by mass with respect to the polyvinyl alcohol as a binder.

TABLE 5

| Number of coating liquid for low refractive index layer | Copolymer with pH dependency Type | Addition amount (*1) | Physical properties of coating film pH | Viscosity (mN/m) |
|---|---|---|---|---|
| 2-1 | — | — | 4.0 | 10 |
| 2-2 | — | — | 4.0 | 12 |
| 2-3 | VP-1 | 0.1 | 4.0 | 29 |
| 2-4 | VP-1 | 0.5 | 4.0 | 42 |
| 2-5 | VP-1 | 1.0 | 4.0 | 50 |
| 2-6 | VP-1 | 2.0 | 4.0 | 54 |

TABLE 5-continued

| Number of coating liquid for low refractive index layer | Copolymer with pH dependency Type | Copolymer with pH dependency Addition amount (*1) | Physical properties of coating film pH | Physical properties of coating film Viscosity (mN/m) |
|---|---|---|---|---|
| 2-7 | VP-1 | 4.0 | 4.0 | 58 |
| 2-8 | VP-1 | 6.0 | 4.0 | 61 |
| 2-9 | VP-2 | 1.0 | 4.0 | 52 |
| 2-10 | VP-3 | 1.0 | 4.0 | 48 |
| 2-11 | VP-4 | 1.0 | 4.0 | 51 |
| 2-12 | VP-5 | 1.0 | 4.0 | 50 |
| 2-13 | VP-6 | 1.0 | 4.0 | 51 |
| 2-14 | VP-7 | 1.0 | 4.0 | 48 |
| 2-15 | VP-8 | 1.0 | 4.0 | 51 |
| 2-16 | VP-9 | 1.0 | 4.0 | 50 |
| 2-17 | VP-10 | 1.0 | 4.0 | 52 |

(*1): % by mass with respect to the total binder amount

[Preparation of Coating Liquid for High Refractive Index Layer]
(Preparation of Coating Liquid 1 for High Refractive Index Layer)

To 15.2 g of 20.0% by mass titanium oxide sol (volume average particle diameter of 35 nm, rutile type titanium oxide particles), 225 g of 5.0% by mass aqueous solution of acid-treated gelatin was slowly added and mixed under stirring. Subsequently, as a surface active agent, 0.43 g of 5.0% by mass aqueous solution of 2-DB-500E (as described above, manufactured by NOF Corporation) was added and finished with 450 mL of pure water to prepare the coating liquid 2-1 for the high refractive index layer.

(Preparation of Coating Liquid 2-2 for High Refractive Index Layer)

The coating liquid 2-2 for the high refractive index layer was prepared in the same manner as the preparation of the coating liquid 2-1 for the high refractive index layer except that a mixture of polyvinyl alcohol and collagen peptide (1:2.5 (mass ratio) mixture of PVA217 and collagen peptide) in the same solid content was used instead of the aqueous solution of acid-treated gelatin.

(Preparation of Coating Liquid 2-3 for High Refractive Index Layer)

The coating liquid 2-3 for the high refractive index layer was prepared in the same manner as the preparation of the coating liquid 2-2 for the high refractive index layer except that tamarind seed gum was added as an aqueous solution such that it was 5.0% by mass with respect to the total solid content 100% by mass of the mixture of polyvinyl alcohol and collagen peptide.

(Preparation of Coating Liquids 2-4 to 2-20 for High Refractive Index Layer)

The coating liquids 2-4 to 2-20 for the high refractive index layer were prepared in the same manner as the preparation of the coating liquid 2-2 for the high refractive index layer except that the copolymer having pH dependency of viscosity of the present invention or other additives (thickening polysaccharides) are added according to the types and condition listed in Table 6. Meanwhile, depending on an addition amount of each additive, an amount of pure water was appropriately adjusted and the total amount of the coating liquid was adjusted to be equal to the amount of the coating liquid 2-2 for the high refractive index layer. The addition amount of the copolymer having pH dependency of viscosity listed in Table 6 is expressed in % by mass with respect to the polyvinyl alcohol as a binder.

TABLE 6

| Number of coating liquid for high refractive index layer | Copolymer with pH dependency Type | Copolymer with pH dependency Addition amount (*1) | Other additives Type | Other additives Addition amount (*1) | Physical properties of coating film pH | Physical properties of coating film Viscosity (mN/m) |
|---|---|---|---|---|---|---|
| 2-1 | — | — | — | — | 2.8 | 9 |
| 2-2 | — | — | — | — | 3.0 | 6 |
| 2-3 | — | — | Locust bean gum | 5.0 | 3.0 | 10 |
| 2-4 | VP-1 | 0.1 | — | — | 3.0 | 33 |
| 2-5 | VP-1 | 0.5 | — | — | 3.0 | 39 |
| 2-6 | VP-1 | 1.0 | — | 5.0 | 3.0 | 46 |
| 2-7 | VP-1 | 2.0 | — | — | 3.0 | 49 |
| 2-8 | VP-1 | 4.0 | — | — | 3.0 | 55 |
| 2-9 | VP-1 | 6.0 | — | — | 3.0 | 60 |
| 2-10 | VP-2 | 1.0 | — | — | 3.0 | 47 |
| 2-11 | VP-3 | 1.0 | — | — | 3.0 | 43 |
| 2-12 | VP-4 | 1.0 | — | — | 3.0 | 45 |
| 2-13 | VP-5 | 1.0 | Tamarind seed gum | 5.0 | 3.0 | 49 |
| 2-14 | VP-5 | 1.0 | Locust bean gum | 5.0 | 3.0 | 51 |
| 2-15 | VP-5 | 1.0 | — | — | 3.0 | 48 |
| 2-16 | VP-6 | 1.0 | — | — | 3.0 | 49 |
| 2-17 | VP-7 | 1.0 | — | — | 3.0 | 48 |
| 2-18 | VP-8 | 1.0 | — | — | 3.0 | 49 |
| 2-19 | VP-9 | 1.0 | — | — | 3.0 | 48 |
| 2-20 | VP-10 | 1.0 | — | — | 3.0 | 50 |

(*1): % by mass with respect to the binder amount

Meanwhile, the pH and viscosity listed in Tables 5 and 6 were measured according to the same method as described above.

<<Production of Infrared Shielding Film>>
[Production of Infrared Shielding Film 2-1]

By using a slide hopper coating apparatus which can be used for 16-layer multilayer coating, the coating liquid 2-1 for the low refractive index layer and the coating liquid 2-1 for the high refractive index layer under heating at 45° C. as prepared above were coated by turns, each in 8 layers, on a polyethylene terephthalate film with a thickness of 50 μm (A4300 manufactured by Toyobo Co., Ltd.; easy adhesion layer on both surfaces), which has been heated to 45° C., such that a thickness of each low refractive index layer was 180 nm and a thickness of each high refractive index layer was 130 nm after drying, that is, the total 16 layers were formed by a simultaneous multilayer coating at the rate to 100 m per minute. Right after the coating, cold air at 5° C. was applied for setting. At that time, the time until nothing sticks to the finger even after the surface was touched by a finger (that is, setting time) was 5 min. Upon the completion of the setting, it was applied with hot air at 80° C. for drying to produce the infrared shielding film 2-1.

[Production of Infrared Shielding Films 2-2 to 2-20]

The infrared shielding films 2-2 to 2-20 were produced in the same manner as the production of the infrared shielding film 2-1 except that each of the coating liquids 2-2 to 2-17 for the low refractive index layer and the coating liquids 2-2 to 2-20 for the high refractive index layer listed in Table 7 are used instead of the coating liquid 2-1 for the low refractive index layer and the coating liquid 2-1 for the high refractive index layer.

<<Evaluation of Infrared Shielding Film>>

Measurements of the following characteristic values and evaluation of the performances were carried out in the same manner as the evaluation of the infrared shielding film obtained in the aforementioned Example 1-1 for each infrared shielding film produced above. The obtained evaluation results and measurement results are listed in Table 7.

ing bodies 2-4 to 2-20 exhibit sufficient visible light transmission and have a high effect of shielding infrared rays

TABLE 7

| Infrared shielding film number | Low refractive index layer | | High refractive index layer | | Coating quality | | Visible light transmitting property | | Infrared reflecting property | | Remarks |
|---|---|---|---|---|---|---|---|---|---|---|---|
| | Coating liquid number | Refractive index | Coating liquid number | Refractive index | Coating uniformity | Interlayer separation property | Visible light transmittance (%) | Fluctuation coefficient (%) (deviation) | Infrared transmittance (%) | Fluctuation coefficient (%) (deviation) | |
| 2-1 | 2-1 | 1.49 | 2-1 | 1.89 | ○ | X | 71 | 9.5 | 27 | 10.6 | Comparative Example |
| 2-2 | 2-2 | 1.49 | 2-2 | 1.89 | X | X | 72 | 10.5 | 24 | 10.1 | Comparative Example |
| 2-3 | 2-2 | 1.49 | 2-3 | 1.89 | X | Δ | 74 | 10.3 | 13 | 7.2 | Comparative Example |
| 2-4 | 2-3 | 1.49 | 2-4 | 1.89 | Δ | ○ | 80 | 3.6 | 18 | 4.5 | Present invention |
| 2-5 | 2-4 | 1.49 | 2-5 | 1.89 | ○ | ○ | 83 | 3.5 | 17 | 3.3 | Present invention |
| 2-6 | 2-5 | 1.49 | 2-6 | 1.89 | ○ | ○ | 84 | 3.3 | 15 | 3.1 | Present invention |
| 2-7 | 2-6 | 1.49 | 2-7 | 1.89 | ○ | ○ | 84 | 3.2 | 15 | 3.3 | Present invention |
| 2-8 | 2-7 | 1.49 | 2-8 | 1.89 | ○ | ○ | 85 | 3.3 | 17 | 3.6 | Present invention |
| 2-9 | 2-8 | 1.49 | 2-9 | 1.89 | Δ | ○ | 84 | 3.5 | 18 | 4.1 | Present invention |
| 2-10 | 2-9 | 1.49 | 2-10 | 1.89 | ○ | ○ | 82 | 3.6 | 15 | 3.1 | Present invention |
| 2-11 | 2-10 | 1.49 | 2-11 | 1.89 | ○ | ○ | 84 | 3.7 | 16 | 3.3 | Present invention |
| 2-12 | 2-11 | 1.49 | 2-12 | 1.89 | ○ | ○ | 85 | 3.3 | 17 | 3.2 | Present invention |
| 2-13 | 2-12 | 1.49 | 2-13 | 1.89 | ○ | ○ | 84 | 3.4 | 13 | 3.0 | Present invention |
| 2-14 | 2-12 | 1.49 | 2-14 | 1.89 | ○ | ○ | 86 | 3.3 | 12 | 2.9 | Present invention |
| 2-15 | 2-12 | 1.49 | 2-15 | 1.89 | ○ | ○ | 85 | 3.2 | 13 | 3.0 | Present invention |
| 2-16 | 2-13 | 1.49 | 2-16 | 1.89 | ○ | ○ | 83 | 3.6 | 13 | 3.1 | Present invention |
| 2-17 | 2-14 | 1.49 | 2-17 | 1.89 | ○ | ○ | 82 | 3.4 | 15 | 3.3 | Present invention |
| 2-18 | 2-15 | 1.49 | 2-18 | 1.89 | ○ | ○ | 82 | 3.8 | 15 | 3.7 | Present invention |
| 2-19 | 2-16 | 1.49 | 2-19 | 1.89 | ○ | ○ | 82 | 3.6 | 15 | 3.6 | Present invention |
| 2-20 | 2-17 | 1.49 | 2-20 | 1.89 | ○ | ○ | 84 | 3.6 | 14 | 3.3 | Present invention |

According to the result listed in Table 7, it was found that the infrared shielding film of the present invention in which the copolymer having pH dependency according to the present invention was used can be produced by a coating method having excellent productivity, and as high infrared reflectance can be achieved without lowering the visible light transmittance and deviation in optical characteristics was small, a coating film with excellent uniformity was obtained.

Example 2-2

Production of Infrared Shielded

The infrared shielding films 2-1 to 2-20 produced in Example 2-1 were used for adhesion on a glass substrate via adhesives to produce the infrared shielding bodies 2-1 to 2-20.
<<Evaluation of Infrared Shielding Body>>
The infrared shielding body produced above was installed as a windowpane, and then infrared shielding property against light was evaluated. As a result, the infrared shielding bodies 2-4 to 2-20 exhibit sufficient visible light transmission and have a high effect of shielding infrared rays compared to Comparative Examples, and thus they were confirmed so be a windowpane having an excellent energy saving property.

Example 3-1

Production of Infrared Shielding Film

[Production of Infrared Shielding Film 3-1]
(Production of Coating Liquid 3-1 for Low Refractive Index Layer)
9.18 parts of 23.5% by mass aqueous solution of aluminum polychloride (manufactured by Taki Chemical Co., Ltd.; TAKIBINE #1500), 340 parts of 15% by mass aqueous solution of colloidal silica (manufactured by Nissan Chemical Industries, Ltd.; SNOWTEX OUP), 103.4 parts of 5.5% by mass aqueous solution of boric acid, and 4.75 parts of 2.1% by mass aqueous solution of lithium hydroxide were mixed area dispersed using a high pressure homogenizes disperser. After dispersion, it was treated with 1000 parts of pure water to prepare silicon oxide dispersion 1.

Subsequently, the dispersion 1 was heated to 45° C., and added with 100 parts of pure water and 400 parts of 4.0% by mass aqueous solution of polyvinyl alcohol (PVA217, manufactured by Kuraray Co., Ltd.; under stirring, and further added with 0.50 parts of 5% by mass aqueous solution of quaternary ammonium salt-based cationic surface active agent (manufactured by NOF Corporation, Nissan Cation-2-DB-500E) as a cationic surface active agent to prepare the coating liquid 3-1 for the low refractive index Layer.

(Preparation of Coating Liquid 3-1 for High Refractive Index Layer)

28.9 parts of 20.0% by mass water based dispersion of titanium oxide sol containing rutile type titanium oxide microparticles with a volume average particle diameter of 35 nm, 5.41 parts of 14.8% by mass aqueous solution of picolinic acid, and 3.92 parts of 2.1% by mass aqueous solution of lithium hydroxide were mixed, and then dispersed using a high pressure homogenizer disperses to prepare titanium oxide dispersion 1.

Subsequently, to 10.3 parts of pure water, 130 parts of 1.0% by mass aqueous solution of tamarind seed gum as thickening polysaccharides, 10.3 parts of 5.0% by mass aqueous solution of polyvinyl alcohol (PVA217, manufactured by Kuraray Co., Ltd.), 17.3 parts of 14.8% by mass aqueous solution of picolinic acid, and 2.58 parts of 5.5% by mass aqueous solution of boric acid were sequentially added under mixing, and then further added with 38.2 parts of titanium oxide dispersion 3-1 under mixing. It was also added with 0.050 parts of 5% by mass aqueous solution of quaternary ammonium salt-based cationic surface active agent (manufactured by NOF Corporation, Nissan Cation-2-DB-500E), and treated with 223 parts of pure water as a final step to prepare the coating liquid 3-1 for the high refractive index layer.

(Production of Infrared Shielding Film 3-1)

By using a slide hopper coating apparatus which can be used for 9-layer multilayer coating, the coating liquid 3-1 for the low refractive index layer and the coating liquid 3-1 for the high refractive index layer under heating at 45° C. as prepared above were coated by turns on a polyethylene terephthalate film with a thickness of 50 μm (A4300 manufactured by Toyobo Co., Ltd.; easy adhesion layer on both surfaces), which has been heated to 45° C., such that a thickness of each low refractive index layer was 150 nm and a thickness of each high refractive index layer was 150 nm after drying, that is, the total 9 layers were formed by a simultaneous multilayer coating.

Right after the coating, cold air at 5° C. was applied for setting. At that time, the time until nothing sticks to the ringer even after the surface was touched by a finger (that is, setting time) was 5 min.

Upon the completion of the setting, it was applied with hot air at 80° C. to produce a multilayer coating product consisting of 9 layers.

On top of the multilayer coating product with 9 layers, 9-layer multilayer coaling was further performed two times to produce the infrared shielding film 3-1 consisting of 27 layers in total.

[Production of Infrared Shielding Film 3-2]

(Preparation of Coating Liquid 3-2 for Low Refractive Index Layer)

The coating liquid 3-2 for the low refractive index layer was prepared in the same manner as the preparation of the coating liquid 3-1 for the low refractive index layer, which was used for production of the infrared shielding film 3-1, except that 400 parts of 4.0% by mass aqueous solution of polyvinyl alcohol (PVA217, manufactured by Kuraray Co., Ltd.) was changed to 400 parts of 4.0% by mass aqueous solution of polyvinyl alcohol (PVA235, manufactured by Kuraray Co., Ltd.).

(Production of Infrared Shielding Film 3-2)

The infrared shielding film 3-2 was produced in the same manner as the production of the infrared shielding film 3-1 except that the coating liquid 3-2 for the low refractive index layer was used instead of the coating liquid 3-1 for the low refractive index layer.

[Production of Infrared Shielding Film 3-3]

(Preparation of Modified Polyvinyl Alcohol HPVA1)

To a separable flask equipped with a cooling condenser, a dropping funnel, a thermometer, a tube for introducing nitrogen, and a stirrer, 175.8 g of PVA (polymerization degree of 1700, and saponification degree of 88%) and 582.3 g of ion exchange water were added, dispersed at room temperature, and completely dissolved at 95° C. Subsequently, 5.4 g of acrylic acid and 37.3 g of methyl methacrylate were added, purged with nitrogen, and after the temperature was increased to 50° C., 8.5 g of tertiary butyl hydroperoxide and 8.5 g of sodium erysorbate were added. The reaction was completed after four hours to obtain modified polyvinyl alcohol HPVA1. The obtained modified polyvinyl alcohol HPVA1 was dried and pulverized, and prepared as 4.0% by mass aqueous solution.

(Preparation of Coating Liquid 3-3 for Low Refractive Index Layer)

The coating liquid 3-3 for the low refractive index layer was prepared in the same manner as the preparation of the coating liquid 3-1 for the low refractive index layer, which was used for production of the sample 101, except that 400 parts of 4.0% by mass aqueous solution of polyvinyl alcohol (PVA217, manufactured by Kuraray Co., Ltd.) was changed to 280 parts of 4.0% by mass aqueous solution of polyvinyl alcohol (PVA217, manufactured by Kuraray Co., Ltd.) and 120 parts of 4.0% by mass aqueous solution of modified polyvinyl alcohol HPVA1.

(Method for Producing Infrared Shielding Film 3-3)

The infrared shielding film 3-3 was produced in the same manner as the preparation of the infrared shielding film 3-1 except that the coating liquid 3-3 for the low refractive index layer was used instead of the coating liquid 3-1 for the low refractive index layer 3-1.

[Production of Infrared Shielding Film 3-4]

The infrared shielding film 3-4 was produced in the same manner as the preparation of the coating liquid 3-3 for the low refractive index layer regarding the infrared shielding film 3-3, except that 280 parts of 4.0% by mass aqueous solution of polyvinyl alcohol (PVA235, manufactured by Kuraray Co., Ltd.) was used instead of 280 parts of 4.0% by mass aqueous solution of polyvinyl alcohol (PVA217, manufactured by Kuraray Co., Ltd.).

[Production of Infrared Shielding Films 3-3 and 3-6]

The infrared shielding films 3-5 and 3-6 were produced in the same manner as the infrared shielding film 3-3, except that the layer applied with the coating liquid for the low refractive index layer in which modified polyvinyl alcohol was used changed as listed in Table 8.

[Production of Infrared Shielding Films 3-7 and 3-8]

The infrared shielding films 3-7 and 3-8 were produced in the same manner as the infrared shielding film 3-3, except that, as listed in Table 3, 280 parts of 4.0% by mass aqueous solution of polyvinyl alcohol (PVA217, manufactured by Kuraray Co., Ltd.) and 120 parts of 4.0% by mass aqueous solution of modified polyvinyl alcohol HPVA1 used in the preparation of the coating liquid 3-3 for the low refractive index layer are changed to 200 parts of 4.0% by mass aqueous solution of polyvinyl alcohol (PVA217, manufactured by Kuraray Co., Ltd.) and 200 parts of 4.0% by mass aqueous solution of modified polyvinyl alcohol HPVA2 (infrared shielding films 3-7), or changed to 400 parts of 4.0% by mass aqueous solution of modified polyvinyl alcohol HPVA1 (infrared shielding film 3-8).

[Production of Infrared Shielding Films 3-9 to 3-12]

As listed in Table 8, the polymerization degree of polyvinyl alcohol as a raw material for synthesis in the synthesis of the modified polyvinyl alcohol HPVA1 was changed to synthesize modified polyvinyl alcohol HPVA2 to HPVA6.

Subsequently, the infrared shielding films 3-9 to 3-12 were produced in the same manner as the production of the infrared shielding film 3-3 except that HVP2 to HPVA6 are used instead of modified polyvinyl alcohol HPVA1.

[Production of Infrared Shielding Film Samples 3-13 and 3-14]

The infrared shielding films 3-13 and 3-14 were produced in the same manner as the infrared shielding film 3-3, except that, as listed in Table 8, each of 4.0% by mass aqueous solution of cation modified PVA (manufactured by The Nippon Synthetic Chemical Industry Co., Ltd.; K-210), hydrophilic group modified PVA (manufactured by The Nippon Synthetic Chemical Industry Co., Ltd.; ECOMATY WO-320R) was used instead of 4.0% by mass aqueous solution of modified polyvinyl alcohol HPVA1 used in the preparation of the coating liquid 3-3 for the low refractive index layer.

<<Evaluation of Infrared Shielding Film>>

The infrared shielding films 3-1 to 3-14 produced above were subjected to the following performance evaluation.

(Measurement of Single Layer Refractive Index of Each Layer)

A sample prepared by single-layer coating of subject layer (the high refractive index layer, the low refractive index layer) for measuring the refractive index on a substrate was produced, and the refractive index of each of the high refractive index layer and the low refractive index layer was measured according to the following method.

After a roughing treatment was conducted on the back surface opposite to the measurement side of each sample, a light absorbing treatment was carried out using a black spray to prevent light reflection from the back surface. Using a spectrophotometer U-4000 (manufactured by Hitachi Ltd.), the reflectance in visible light region (400 nm to 700 nm) was measured under 5 degree mirror reflection to obtain the refractive index.

As a result of measuring the refractive index of each layer according to the above method, it was confirmed that the difference in refractive index between the high refractive index layer and the low refractive index layer was at least 0.1 for all cases.

TABLE 8

| Infrared shielding film number | High refractive index layer | | Low refractive index layer | | | | | |
| | Metal oxide particles | Binder | Metal oxide particles | Binder | *PVA polymerization degree in modified PVA | (Ratio) | Added layer | Remarks |
| --- | --- | --- | --- | --- | --- | --- | --- | --- |
| 3-1 | TiO$_2$ | Tamarind/PVA217 | SiO$_2$ | PVA217 | | | Entire layer | Comparative Example |
| 3-2 | ↓ | ↓/↓ | ↓ | PVA235 | | | Entire layer | Comparative Example |
| 3-3 | ↓ | ↓/↓ | ↓ | PVA217/HPVA1 | *PVA polymerization degree 1400 | (7/3) | Entire layer | Present invention |
| 3-4 | ↓ | ↓/↓ | ↓ | PVA235/↓ | | ↓ | Entire layer | Present invention |
| 3-5 | ↓ | ↓/↓ | ↓ | ↓/↓ | | ↓ | Only the lowermost layer | Present invention |
| 3-6 | ↓ | ↓/↓ | ↓ | ↓/↓ | | ↓ | Lowermost layer + Uppermost layer | Present invention |
| 3-7 | ↓ | ↓/↓ | ↓ | ↓/↓ | | (5/5) | Entire layer | Present invention |
| 3-8 | ↓ | ↓/↓ | ↓ | ↓/↓ | | (0/10) | Entire layer | Present invention |
| 3-9 | ↓ | ↓/↓ | ↓ | ↓/HPVA2 | PVA polymerization degree 1700 | (7/3) | Entire layer | Present invention |
| 3-10 | ↓ | ↓/↓ | ↓ | ↓/HPVA3 | PVA polymerization degree 1200 | (7/3) | Entire layer | Present invention |
| 3-11 | ↓ | ↓/↓ | ↓ | ↓/HPVA4 | PVA polymerization degree 600 | (7/3) | Entire layer | Present invention |
| 3-12 | ↓ | ↓/↓ | ↓ | ↓/HPVA5 | PVA polymerization degree 300 | (7/3) | Entire layer | Present invention |
| 3-13 | ↓ | ↓/↓ | ↓ | ↓/K-210 | | (7/3) | Entire layer | Present invention |
| 3-14 | ↓ | ↓/↓ | ↓ | ↓/WO-320R | | (7/3) | Entire layer | Present invention |

(Measurement of Visible Light Transmittance and Infrared Transmittance)

By using the above spectrophotometer (U-4000, an integrating sphere was used, manufactured by Hitachi Ltd.), the light transmittance of the infrared shielding films 3-1 to 3-14 was measured in the region of 300 nm to 2000 nm. The transmittance at 500 nm was used as a visible light transmittance, and the transmittance at 1200 nm was used as infrared transmittance.

(Evaluation of Durability Against Changes in Temperature and Humidity)

The infrared shielding films 3-1 to 3-14 were kept at a high temperature and a high humidity condition at 40° C. 80% for 4 hours, after that, they were transferred to an environment of 20° C., 50% over 2 hours, further kept for 4 hour in the same state, and brought back to the state of 40° C., 80% over 2 hours. A single cycle consists of those whole processes and a durability test against changes in a temperature and humidity was performed with 6 cycles in total. After that, the visible light transmittance and infrared transmittance were obtained again as described above.

For each infrared shielding film sample after the above durability test against changes in a temperature and humidity was subjected to 30 times of a bending test according to the method of flexibility test based on JIS K5600-5-1 using a flexibility testing apparatus Type 1 (IMC-AOF2, diameter of mandrel: φ 20 mm, manufactured by Imoto Machinery Co., Ltd.). The surface of the infrared shielding film was then observed with naked eyes, and the coating film strength was evaluated according to the following criteria.

5: Creases or cracks are not observed on the surface of the infrared shielding film 4: Slight creases are observed on the surface of the infrared shielding film 3: Slight irregularities are observed on the surface of the infrared shielding film 2: Some tiny cracks are observed on the surface of the infrared shielding film 1: Many apparent cracks occurred on the surface of the infrared shielding film The results from the above tests are listed in Table 9.

TABLE 9

| Infrared shielding film number | Before thermo cycle | | After thermo cycle | | Coating film strength | Remarks |
|---|---|---|---|---|---|---|
| | Visible light transmittance (%) | Infrared transmittance (%) | Visible light transmittance (%) | Infrared transmittance (%) | | |
| 3-1 | 84 | 7 | 66 | 19 | 1 | Comparative Example |
| 3-2 | 85 | 5 | 70 | 17 | 2 | Comparative Example |
| 3-3 | 86 | 6 | 83 | 11 | 4 | Present invention |
| 3-4 | 87 | 5 | 84 | 8 | 5 | Present invention |
| 3-5 | 90 | 6 | 84 | 14 | 3 | Present invention |
| 3-6 | 89 | 6 | 86 | 12 | 4 | Present invention |
| 3-7 | 84 | 8 | 82 | 11 | 5 | Present invention |
| 3-8 | 82 | 9 | 81 | 10 | 5 | Present invention |
| 3-9 | 84 | 8 | 80 | 11 | 5 | Present invention |
| 3-10 | 84 | 8 | 78 | 12 | 4 | Present invention |
| 3-11 | 84 | 9 | 77 | 15 | 3 | Present invention |
| 3-12 | 83 | 10 | 76 | 16 | 3 | Present invention |
| 3-13 | 82 | 8 | 73 | 15 | 3 | Present invention |
| 3-14 | 81 | 8 | 72 | 14 | 3 | Present invention |

As exhibited in the results of Table 9, it was found that the infrared shielding film of the present invention in which the modified polyvinyl alcohol of the present invention was used can be produced by a coating method with excellent productivity. Further, although the evaluation method of Example 3 was slightly different from Examples 1 and 2 described above, it was evident that the infrared shielding film of the present invention in which the modified polyvinyl alcohol of the present invention was used can achieve high infrared reflectance without lowering the visible light transmittance. It was also found that the infrared shielding film has small deviation in optical characteristics, can produce a coating film with excellent uniformity, has high visible light transmittance and low infrared transmittance even after repeated changes in a temperature and humidity, and has high coating film strength.

Example 3-2

Production of Infrared Shielding Film

[Production of Infrared Shielding Films 3-13 and 3-16]

The infrared shielding films 3-15 and 3-16 were produced in the same manner as the infrared shielding film 3-3 of Example 3-1, except that, as listed in Table 10, 10.3 parts of each of 5.0% by mass aqueous solution of modified polyvinyl alcohol HPVA1 and HPVA2 was used instead of 10.3 parts of 5.0% by mass aqueous solution of polyvinyl alcohol (PVA217, manufactured by Kuraray Co., Ltd.) used in the preparation of the coating liquid 3-1 for the high refractive index layer.

TABLE 10

| Infrared shielding film number | High refractive index layer - Metal oxide particles | Binder | Added layer | Low refractive index layer - Metal oxide particles | Binder | * PVA polymerization degree in modified PVA | (Ratio) | Added layer | Remarks |
|---|---|---|---|---|---|---|---|---|---|
| 3-3 | TiO₂ | Tamarind/PVA217 | — | ↓ | PVA217/HPVA1 | * PVA polymerization degree 1400 | (7/3) | Entire layer | Present invention |
| 3-15 | ↓ | ↓/HAPV1 | Entire layer | ↓ | PVA217 ↓ | | | Entire layer | Present invention |
| 3-16 | ↓ | ↓/HAPV2 | Entire layer | ↓ | PVA217/↓ | | | Entire layer | Present invention |

<<Evaluation of Infrared Shielding Film>>

Subsequently, for the infrared shielding films 3-15 and 3-16 produced above, evaluations of visible light transmitting property, near-infrared transmitting property, and durability were evaluated in the same manner as the method described in Example 3-1. As a result, it was confirmed that the same effect as the infrared shielding film 3-3 described in Example 3-1 was obtained in all cases.

Example 3-3

Production of Infrared Shield

[Production of Infrared Shielding Bodies 3-1 to 3-6]

Infrared shielding bodies 3-1 to 3-6 were produced by pasting each of the infrared shielding films 3-3 to 3-8 produced in Example 3-1 on a transparent acrylate resin plate having a thickness of 5 mm and a size of 20 cm×20 cm by adhering each using acryl adhesives.

<<Evaluation of Infrared Shield>>

The infrared shielding bodies 3-1 to 3-6 of the present invention as produced above are easily usable, even though the infrared shielding bodies have a large size. In addition, an excellent infrared reflecting property vas confirmed by using the infrared shielding film of the present invention.

Example 4-1

Production of Infrared Shielding Film

Production Examples

Preparation Example 1

Preparation of Dispersion 1 of Silica Hollow Fine Particles

To 170 parts of 9% by mass aqueous dispersion of calcium carbonate (Uni Flex SS manufactured by Newlime, average particle diameter of 40 nm) were added 8 parts of 28% ammonia water. After stirring for 10 min, 20 parts of tetraethoxysilane were added and stirred for 1 hour at room temperature. After that, the temperature was increased to 60° C. and stirring was performed for 3 hours. After cooling to room temperature, a dispersion of silica-coated calcium carbonate was obtained. Next, to 100 parts of the dispersion of silica-coated calcium carbonate was added aqueous solution of acetic acid and the reaction was allowed to occur until carbonate gas bubbles due to decomposition reaction of calcium carbonate are no longer generated so that the calcium carbonate can be eluted. To the reaction solution were added 200 parts of distilled water and 200 parts of the aqueous solution was discharged by using an ultrafiltration membrane. The same procedure was repeated three times to obtain dispersion 1 of silica hollow fine particles which have an outer shell made of 10% by mass silica. The average particle pore diameter and average thickness of the outer shell of the hollow fine particles in the dispersion was 40 nm and 5 nm, respectively.

Preparation Example 2

Preparation of Dispersion 1 of Thermally Decomposable Resin

Under argon atmosphere, 0.2 parts of n-pentanol and 0.16 parts of trifluoromethane sulfonic acid were added sequentially to a solution containing 2 parts of γ-butyrolactam (manufactured by Nacalai Tesque) dissolved in 4 parts of toluene, and stirred for 1 hour at 30° C. Next, after distilling off the toluene, the obtained product was washed with ether to obtain the polymerization product poly-γ-butyrolactam (molecular weight of 4,000 and Tc=76° C.).

To an emulsifier (manufactured by Tobushu Kika Kogyo Co., Ltd., TK combi mix type) equipped with a disperser stirrer (top and bottom mixing type high speed stirring), a mixer stirrer (shear type high speed stirring), and an anchor stirrer (low speed stirring based on an anchor type wing), as a thermally decomposable resin were added 100 parts of poly-γ-butyrolactam (molecular weight of 4,000 and Tc=76° C.) obtained from above and 100 parts of toluene, and the temperature was increased to 60° C. to dissolve poly-γ-butyrolactam. Next, while maintaining the internal temperature at 50° C., 45 parts of RONJISU K-80 (effective component: 36 parts) and 30 parts of NEOGEN S-20F (effective component: 6 parts) were dissolved in 45 parts of hot water at 50° C. and added thereto as an emulsifying dispersant. After emulsification with mixer wing running speed of 12.8 m/s, disperser wing running speed of 9.6 m/s, and anchor wing revolution number of 60 rpm, 250 parts of pure water were again added dropwise thereto over 60 min to obtain an emulsified dispersion. Toluene in the obtained emulsified dispersion was distilled off under reduced pressure by using a rotary evaporator (type N-11, manufactured by TOKYO RIKAKIKAI Co., Ltd.) to have a residual toluene amount of 0.05%. As a result, the dispersion 1 of thermally decomposable resin was obtained. The concentration of the thermally decomposable resin in the dispersion 1 of thermally decomposable resin was 21% by mass and the particle diameter of the thermally decomposable resin was 30 nm.

Preparation Example 3

Preparation of Dispersion 2 of Thermally Decomposable Resin

1 Part of α,α,α,α-tetraaryl-1,3-dioxolane-4,5-dimethanol was dissolved in 15 parts of toluene, added with 40.8 parts of Ti(OtBu), and stirred for 1.5 hours. The mixture was heated to 100° C. and 10 parts of the toluene was distilled off. Further, under reduced pressure at room temperature, the remaining solvent was removed by distillation to obtain a titanium complex. To a solution containing 1 part of the titanium complex added to 15 parts of toluene were added 2 parts of trichloroacetaldehyde (manufactured by SHOWA CHEMICAL Co., Ltd.). After stirring at room temperature for 12 hours, 10 parts of acetic anhydride and 3 parts of pyridine were added, stirred for 30 min, and the reaction was terminated. The mixture solution was filtered using a filter paper and washed with 10 parts by mass of ether to obtain the polymerization product poly-trichloroaldehyde (molecular weight of 3,000 and Tc=18° C.).

Except that poly-trichloroaldehyde (molecular weight of 3,000 and Tc=18° C.) obtained above was used instead of poly-γ-butyrolactam (Tc=76° C.), the dispersion 2 of thermally decomposable resin was produced in the same manner as Preparation Example 2. The concentration of the thermally decomposable resin in the dispersion 2 of thermally decomposable resin was 21% by mass and the particle diameter of the thermally decomposable resin was 30 nm.

Preparation Example 4

Preparation of Dispersion 3 of Thermally Decomposable Resin

To an emulsifier (manufactured by Tokushu Kika Kogyo Co., Ltd., TK combi mix type) equipped with a disperser stirrer (top and bottom mixing type high speed stirring), a mixer stirrer (shear type high speed stirring), and an anchor stirrer (low speed stirring based on en anchor type wing), as a thermally decomposable resin were added 100 parts of poly-γ-butyrolactam (molecular weight or 4,000 and Tc=76° C.) obtained from Preparation Example 2, 0.02 parts of t-butyl peroxy-2-ethylhexanoate (10-hour half time temperature: 72° C.) (PERBUTYL O, manufactured by NOF Corporation) as a thermal radical generator, and 400 parts of toluene, and the temperature was increased to 60° C. to dissolve poly-γ-butyrolactam. Next, while maintaining the internal temperature at 50° C., 45 parts of RONJISU K-80 (effective component: 36 parts) and 30 parts of NEOGEN S-20F (effective component: 6 parts) were dissolved in 45 parts of hot water at 50° C. and added thereto as an emulsifying dispersant. After emulsification with mixer wing running speed of 12.8 m/s, disperser wing running speed of 9.6 m/s, and anchor wing revolution number of 60 rpm, 250 parts of pure water were again added dropwise thereto over 60 min to obtain an emulsified dispersion. Toluene in the obtained emulsified dispersion was distilled off under reduced pressure by using a rotary evaporator (type N-11, manufactured by TOKYO RIKAKIKAI Co., Ltd.) to have a residual toluene amount of 0.05%. The concentration of the thermally decomposable resin in the dispersion 3 of thermally decomposable resin was 21% by mass and the particle diameter of the thermally decomposable resin was 30 nm.

Preparation Example 5

Preparation of Coating Liquid 4-1 for Low Refractive Index Layer

To 95 parts of pure water were added 5 parts of acid-treated gelatin (molecular weight of 130,000, product name: AP-57, Nippi, Inc.) as a water soluble resin. After allowing it swelling for a while at room temperature, it was heated to 40° C. and mixed by stirring for dissolving the gelatin. As a result, 5% aqueous gelatin solution was obtained. Next, to 10 parts of 10% by mass acidic silica sol containing colloidal silica microparticles with an average particle diameter of 5 nm (SNOWTEX OXS: manufactured by Nissan Chemical Industries, Ltd.) was added the above aqueous gelatin solution slowly under stirring followed by mixing. Further, as a fluorine-based cationic active agent, 0.02 parts of SURFLON S221 (manufactured by AGC Seimi Chemical Co., Ltd.) were added to prepare the coating liquid 4-1 for the low refractive index layer.

By using a wire bar, the coating liquid 4-1 for the low refractive index layer was coated on the polyethylene terephthalate film with a thickness of 50 μm (manufactured by Toyobo Co., Ltd, A4300) under the condition that the dried film thickness becomes 175 nm. By drying with hot air blow at 50° C., a low refractive index layer was formed. The refractive index of the low refractive index layer was 1.48. Meanwhile, the measurement of refractive index was performed as follows: after a roughing treatment was conducted on the back surface opposite to the measurement side of each sample, a light absorbing treatment was carried out using a black spray to prevent light reflection from the back surface, and using a spectrophotometer (U-4000; manufactured by Hitachi Ltd.), the reflectance in visible light region (400 nm to 700 nm) was measured under 5 degree mirror reflection to obtain the refractive index.

Preparation Example 6

Preparation of Coating Liquid 4-2 for Low Refractive Index Layer

The coating liquid 4-2 for the low refractive index layer was prepared in the same manner as Preparation Example 5 except that 10% dispersion of silica hollow fine particles obtained from Preparation Example 1 was used instead of using 10% acidic silica sol.

By using a wire bar, the coating liquid 4-2 for the low refractive index layer was coated on the polyethylene terephthalate film with a thickness of 50 μm (manufactured by Toyobo Co., Ltd., A4300) under the condition that the dried film thickness becomes 175 nm. By drying with hot air blow at 50° C., a low refractive index layer was formed. The refractive index of the low refractive index layer was 1.42.

Preparation Example 7

Preparation of Coating Liquid 4-3 for Low Refractive Index Layer

To 95 parts of pure water were added 5 parts of acid-treated gelatin (molecular weight of 130,000, product name: AP-27, Nippi, Inc.) as a water soluble resin. After allowing it swelling for a while at room temperature, it was heated to 40° C. and mixed by stirring for dissolving the gelatin. As a result, 5% aqueous gelatin solution was obtained. Next, to 10 parts of 10% by mass acidic silica sol containing colloidal silica microparticles with an average particle diameter of 5 nm (SNOWTEX OXS: manufactured by Nissan Chemical Industries, Ltd.) was added the above aqueous gelatin solution slowly under stirring and further mixed with 1.7 parts of the dispersion 1 of the thermally decomposable resin which has been obtained in Preparation Example 2. Further, as a fluorine-based cationic active agent, 0.02 parts of SURFLON S221 (manufactured by AGO Seimi Chemical Co., Ltd.) were added to prepare the coating liquid 4-3 for the low refractive index layer.

By using a wire bar, the coating liquid 4-3 for the low refractive index layer was coated on the polyethylene terephthalate film with a thickness of 50 μm (manufactured by Toyobo Co., Ltd., A4300) under the condition that the dried film thickness becomes 175 nm. By drying with hot air blow at 50° C., a low refractive index layer was formed. The refractive index of the low refractive index layer was 1.48. Next, the film formed with the low refractive index layer was subjected to a heating treatment at 80° C. for 2 hours so that the thermally decomposable resin contained in the low a refractive index layer was decomposed and dissipated to obtain a film having pores formed in the low refractive index layer. The refractive index of the obtained film was 1.31.

Preparation Example 8

Preparation of Coating Liquid 4-4 for Low Refractive Index Layer

The coating liquid 4-4 for the low refractive index layer was prepared in the same manner as Preparation Example 7 except that 10% dispersion of silica hollow fine particles obtained from Preparation Example 1 was used instead of using 10% acidic silica sol.

By using a wire bar, the coating liquid 4-4 for the low refractive index layer was coated on the polyethylene terephthalate film with a thickness of 50 μm (manufactured by Toyobo Co., Ltd., A4300) under the condition that the dried film thickness becomes 175 nm. By drying with hot air blow at 50° C., a low refractive index layer was formed. The refractive index of the low refractive index layer was 1.42. Next, the film, formed with the low refractive index layer was subjected to a heating treatment at 80° C. for 2 hours so that the thermally decomposable resin contained in the low refractive index layer was decomposed and dissipated to obtain a film having pores formed in the low refractive index layer. The refractive index of the obtained film was 1.21.

Further, as a result of performing observations of the low refractive index layer after the heating treatment under a transmission electron microscope, it was found that pores with an average pore diameter of 40 nm were randomly formed.

Preparation Example 9

Preparation of Coating Liquid 4-5 for Low Refractive Index Layer

To 95 parts of pare water were added 5 parts of polyvinyl alcohol (polyvinyl alcohol 235; manufactured by Kuraray Co., Ltd.) as a water soluble resin. After allowing it swelling for a while at room temperature, it was heated to 40° C. and mixed by stirring for dissolving the polyvinyl alcohol. As a result, 5% aqueous polyvinyl alcohol solution was obtained. Next, to 10 parts of 10% by mass acidic silica sol containing colloidal silica microparticles with an average particle diameter of 5 nm (SNOWTEX OXS: manufactured by Nissan Chemical Industries, Ltd.) was added the above aqueous polyvinyl alcohol solution slowly under stirring and further mixed with 1.7 parts of the dispersion 1 of the thermally decomposable resin which has been obtained in Preparation Example 2. Further, as a fluorine-based cationic active agent, 0.02 parts of SURFLON S221 (manufactured by AGC Seimi Chemical Co., Ltd.) were added to prepare the coating liquid 4-5 for the low refractive index layer.

By using a wire bar, the coating liquid 4-5 for the low refractive index layer was coated on the polyethylene terephthalate film with a thickness of 50 μm (manufactured by Toyobo Co., Ltd., A4300) under the condition that the dried film thickness becomes 175 nm. By drying with hot air blow at 50° C., a low refractive index layer was formed. The refractive index of the low refractive index layer was 1.49. Next, the film formed with the low refractive index layer was subjected to a heating treatment at 80° C. 2 hours so that the thermally decomposable resin contained in the low refractive index layer was decomposed and dissipated to obtain a film having pores formed in the low refractive index layer. The refractive index of the obtained film was 1.33. Further, as a result of performing observations of the low refractive index layer after the heating treatment under a transmission electron microscope, it was found that pores with an average pore diameter of 40 nm are randomly formed.

Preparation Example 10

Preparation of Coating Liquid 4-6 for Low Refractive Index Layer

To 95 parts of pure water were added 5 parts of acid-treated gelatin (molecular weight of 130,000, product name: AB-27, Nippi, Inc.) as a water soluble resin. After allowing it swelling for a while at room temperature, it was heated to 40° C. and mixed by stirring for dissolving the gelatin. As a result, 5% aqueous gelatin solution was obtained. Next, to 10 parts of 10% by mass acidic silica sol containing colloidal silica microparticles with an average particle diameter of 5 nm (SNOWTEX OXS: manufactured by Nissan Chemical Industries, Ltd.), the above aqueous gelatin solution was slowly added under stirring and further mixed with 1.7 parts of the dispersion 2 of the thermally decomposable resin which has been obtained in Preparation Example 3. Further, as a fluorine-based cationic active agent, 0.02 parts of SURFLON S221 (manufactured by AGC Seimi Chemical Co., Ltd.) were added to prepare the coating liquid 4-6 for the low refractive index layer.

By using a wire bar, the coating liquid 4-6 for the low refractive index layer was coated on the polyethylene terephthalate film with a thickness of 50 μm (manufactured by Toyobo Co., Ltd., A4300) under the condition that the dried film thickness becomes 175 nm. By drying with hot air blow at 50° C. a low refractive index layer was formed. The refractive index of the low refractive index layer was 1.47. Next, the film formed with the low refractive index layer was subjected to a heating treatment at 80° C. for 2 hours so that the thermally decomposable resin contained in the low refractive index layer was decomposed and dissipated to obtain a film having pores formed in the low refractive index layer. The refractive index of the obtained film was 1.30. Further, as a result of performing observations of the low refractive index layer after the heating treatment under a transmission electron microscope, it was found that pores with an average pore diameter of 40 nm were randomly formed.

Preparation Example 11

Preparation of Coating Liquid 4-1 for Low Refractive Index Layer

The coating liquid 4-7 for the low refractive index layer was prepared in the same manner as Preparation Example 10 except that 10% dispersion of silica hollow fine particles obtained from Preparation Example 1 was used instead of using 10% acidic silica sol.

By using a wire bar, the coating liquid 4-7 for the low refractive index layer was coated on the polyethylene terephthalate film with a thickness of 50 μm (manufactured by Toyobo Co., Ltd. A4300) under the condition that the dried film thickness becomes 175 nm. By drying with hot air blow at 50° C., a low refractive index layer was formed. The refractive index of the low refractive index layer was 1.41. Next, the film formed with the low refractive index layer was subjected to a heating treatment at 80° C. for 2 hours so that the thermally decomposable resin contained in the low refractive index layer was decomposed and dissipated to obtain a film having pores formed in the low refractive index layer. The refractive index of the obtained film was 1.20. Further, as a result of performing observations of the low refractive index layer after the heating treatment under a transmission electron microscope, it was found that pores with an average pore diameter of 40 nm are randomly formed.

Preparation Example 12

Preparation of Coating Liquid 4-8 for Low Refractive Index Layer

To 95 parts of pure water were added 2.5 parts of acid-treated gelatin (molecular weight of 130,000, product name: AP-27, Nippi, Inc.) and 2.5 parts of guar gum (NEOBISUKO G, manufactured by Sansho Co., Ltd.) as a water soluble resin. After allowing it swelling for a while room temperature, it was heated to 40° C. and mixed by stirring for dissolving them. As a result, 5% aqueous solution of the mixed resin was obtained. Next, to 10 parts of 10% by mass dispersion of silica hollow microparticles obtained from Preparation Example 1 was added the aqueous solution containing acid-treated gelatin and guar gum slowly under stirring and further mixed with 1.7 parts of the dispersion 3 of the thermally decomposable resin which has been obtained in Preparation Example 4. Further, as a fluorine-based cationic active agent, 0.02 parts of SURFLON S221 (manufactured by AGC Seimi Chemical Co., Ltd.) were added to prepare the coating liquid 4-8 for the low refractive index layer.

By using a wire bar, the coating liquid 4-8 for the low refractive index layer was coated on the polyethylene terephthalate film with a thickness of 50 μm (manufactured by Toyobo Co., Ltd., A4300) under the condition that the dried film thickness becomes 175 nm. By drying with hot air blow at 50° C., a low refractive index layer was formed. The refractive index of the low refractive index layer was 1.41. Next, the film formed with the low refractive index layer was subjected to a heating treatment at 80° C. for 1 hour so that the thermally decomposable resin contained in the low refractive index layer was decomposed and dissipated to obtain a film having pores formed in the low refractive index layer. The refractive index of the obtained film was 1.20. Further, as a result of performing observations of the low refractive index layer after the heating treatment under a transmission electron microscope, it was found that pores with an average pore diameter of 40 nm were randomly formed.

Preparation Example 13

Preparation of Coating Liquid 4-1 for High Refractive Index Layer

The coating liquid 4-1 for the high refractive index layer was prepared in the same manner as the "coating liquid 2-6 for the high refractive index layer" (containing VP-1 at 1.0% by mass) which has been prepared in Example 2-1 explained above.

By using a wire bar, the coating liquid 4-1 for the high refractive index layer was coated on the polyethylene terephthalate film with a thickness of 50 μm (manufactured by Toyobo Co., Ltd., A4300) under the condition that the dried film thickness becomes 135 nm. By drying with hot air blow at 50° C., a high refractive index layer was formed. The refractive index of the high refractive index layer was 1.89.

Preparation Example 14

Preparation of Coating Liquid 4-2 for High Refractive Index Layer

The coating liquid 4-2 for the high refractive index layer was prepared in the same manner as the "coating liquid 1-12 for the high refractive index layer" (containing HVW105 at 1.0% by mass and locust bean gum at 5.0% by mass) which has been prepared in Example 1-1 explained above.

By using a wire bar, the coating liquid 4-2 for the high refractive index layer was seated on the polyethylene a terephthalate film with a thickness of 50 μm (manufactured by Toyobo Co. Ltd., A4300) under the condition that the dried film thickness becomes 135 nm. By drying with hot air blow at 50° C., a high refractive index layer was formed. The refractive index of the high refractive index layer was 1.89.

Preparation Example 15

Preparation of Coating Liquid 4-3 for High Refractive Index Layer

The coating liquid 4-3 for the high refractive index layer was prepared in the same manner as the "Preparation of coating liquid 3-1 for the high refractive index layer" which has been described in Example 3-1 subscribed above, except that 7.2 parts of 5.0% by mass aqueous solution polyvinyl alcohol (PVA217, manufactured by Kuraray Co., Ltd.) and 3.1 parts of 5.0% by mass aqueous solution of modified polyvinyl alcohol HPVA1 were used instead of 10.3 parts of 5.0% by mass aqueous solution of polyvinyl alcohol (PVA217, manufactured by Kuraray Co., Ltd.).

By using a wire bar, the coating liquid 4-3 for the high refractive index layer was coated on the polyethylene terephthalate film with a thickness of 50 μm (manufactured by Toyobo Co., Ltd., A4300) under the condition that the dried film thickness becomes 135 nm. By drying with hot air blow at 50° C., a high refractive index layer was formed. The refractive index of the high refractive index layer was 1.89.

[Production of Infrared Shielding Film 4-1]

By using a wire bar, the coating liquid 4-1 for the high refractive index layer prepared above was coated on the polyethylene terephthalate film with a thickness of 50 μm (manufactured by Toyobo Co., Ltd., A4300) under the condition that the dried film thickness becomes 131 nm. By drying with hot air blow at 50° C., a high refractive index layer was formed. Next, by using a wire bar, the coating liquid 4-3 for the low refractive index layer was coated on top of the high refractive index layer on the polyethylene terephthalate film under the condition that the dried film thickness becomes 175 nm. By drying with hot air blow at 50° C., a low refractive index layer was formed. Further, on top of the low refractive index layer formed as above, five units, in which one unit consists of the high refractive index layer/the low refractive index layer, were successively coated in the same manner as described above for lamination. Next, the laminate film was subjected to a heating treatment at 80° C. for 2 hours to decompose and dissipate the thermally decomposable resin contained in the low refractive index layer. As a result, the infrared shielding film 4-1 consisting of the high refractive index layer and the low refractive index layer, each in six layers (twelve layers in total), was produced.

[Production of Infrared Shielding Film 4-2]

By using a slide (copper coating apparatus which can be used for 12-layer multilayer coating, the coating liquid 4-3 for the low refractive index layer and the coating liquid 4-1 for the high refractive index layer under heating at 45° C. as prepared above were coated by turns, each in 6 layers, on a polyethylene terephthalate film with a thickness of 50 μm (A4300 manufactured by Toyobo Co., Ltd.; easy adhesion layer on both surfaces), which has been heated to 45° C., such that a thickness of the low refractive index layer was 175 nm and a thickness of the high refractive index layer was 130 nm after drying, that is, the total 12 layers were formed by a simultaneous multilayer coating.

Right after the coating, cold air at 5° C. was applied for setting. At that time, the time until nothing sticks to the finger even after the surface was touched by a finger (setting time) was 5 min.

Upon the completion of the setting, it was applied with hot air at 80° C. to produce the laminate film consisting of twelve layers. Next, the laminate film was subjected to heating treatment at 80° C. for 2 hours to decompose and dissipate the thermally decomposable resin contained in the low refractive index layer. As a result, the infrared shielding film 4-2 consisting of the high refractive index layer and the low refractive index layer, each in six layers (twelve layers in total), was produced.

[Production of Infrared Shielding Film 4-3]

The infrared shielding film 4-3 was processed in the same manner as the production out the infrared shielding film 4-1 except that the coating liquid 4-1 for the high refractive index layer was changed to the coating liquid 4-2 for the high refractive index layer.

[Production of Infrared Shielding Film 4-4]

The infrared shielding film 4-4 was produced in true same manner as the production of the infrared shielding film 4-2 except that the coating liquid 4-1 for the high refractive index layer was changed to the coating liquid 4-2 for the high refractive index layer.

[Production of Infrared Shielding Film 4-5]

By using a wire bar, the coating liquid 4-3 for the high refractive index layer prepared above was coated on the polyethylene terephthalate film with a thickness of 50 μm (manufactured by Toyobo Co., Ltd., A4300) under the condition that the dried film thickness becomes 135 nm. By drying with hot air blow at 50° C., a high refractive index layer was formed. Next, by using a wire bar, the coating liquid 4-5 for the low refractive index layer prepared above was coated on top of the high refractive index layer on the polyethylene terephthalate film under the condition that the dried film thickness becomes 175 nm. By drying with not air blow at 50° C., a low refractive index layer was formed. Further, on top of the low refractive index layer formed as above, five units, in which one unit consists of the high refractive index layer/the low refractive index layer, were successively coated in the ease manner as above for lamination. Next, the laminate film was subjected to a heating treatment at 80° C. for 2 hours to decompose and dissipate the thermally decomposable resin contained in the low refractive index layer. As a result, the infrared shielding film 4-5 consisting of the high refractive index layer and the low refractive index layer, each in six layers (twelve layers in total), was produced.

[Production of Infrared Shielding Film 4-6]

By using a slide hopper coating apparatus which can be used for 12-layer multilayer coating, the coating liquid 4-5 for the low refractive index layer and the coating liquid 4-3 for the high refractive index layer under heating at 45° C. as prepared above were coated by turns, each in 6 layers, on a polyethylene terephthalate film with a thickness of 50 μm (A4300 manufactured by Toyobo Co., Ltd.; easy adhesion layer on both surfaces), which has been heated to 45° C., such that a thickness of each low refractive index layer was 175 nm and a thickness of each high refractive index layer was 130 nm after drying, that is, the total 12 layers were formed by a simultaneous multilayer coating.

Right after the coating, cold air at 5° C. was applied for setting. At that time, the time until nothing sticks to the finger even after the surface was touched by a finger (setting time) was 5 min.

Upon the completion of the setting, it was applied with hot air at 80° C. to produce the laminate film consisting of twelve layers. Next, the laminate film was subjected to a heating treatment at 80° C. for 2 hours to decompose and dissipate the thermally decomposable resin contained in the low refractive index layer. As a result, the infrared shielding film 4-6 consisting of the high refractive index layer and the low refractive index layer, each in six layers (twelve layers in total), was produced.

[Production of Infrared Shielding Film 4-7]

The infrared shielding film 4-7 was produced in the same manner as the production of the infrared shielding film 4-5 except that the coating liquid 4-5 for the low refractive index layer was changed to the coating liquid 4-4 for the low refractive index layer.

[Production of Infrared Shielding Film 4-8]

The infrared shielding film 4-8 was produced in the same manner as the production of the infrared shielding film 4-6 except that the coating liquid 4-5 for the low refractive index layer was changed to the coating liquid 4-4 for the low refractive index layer.

[Production of Infrared Shielding Film 4-9]

The infrared shielding files 4-9 was produced in the same manner as the production of the infrared shielding film 4-8 except that the coating liquid 4-4 for the low refractive index layer was changed to the coating liquid 4-6 for the low refractive index layer.

[Production of Infrared Shielding Film 4-10]

The infrared shielding film 4-10 was produced in the same manner as the production of the infrared shielding film 4-8 except that the coating liquid 4-4 for the low refractive index layer was changed to the coating liquid 4-7 for the low refractive in index layer.

[Production of Infrared Shielding Film 4-11]

The infrared shielding film 4-11 was produced in the same manner as the production of the infrared shielding film 4-8 except that the coating liquid 4-4 for the low refractive index layer was changed to the coating liquid 4-8 for the low refractive index layer.

<<Evaluation of Infrared Shielding Film>>

(Confirmation of Pore Formation in Low Refractive Index Layer)

The pores formed in the low refractive index layer were observed by using a transmission electron microscope, type H-1700FA. They were observed as cyclic, oval, or substantially cyclic or oval pores, and the pore diameter was obtained by randomly selecting any 50 or more pores, calculating the pore diameter for each pore by image analysis, and obtaining the number average of them. As described herein, the pore diameter according to the present invention means the minimum distance among the distances between two parallel lines tangent to the outlines or the diameter of a pore, which was observed to be cyclic, oval, or substantially cyclic or oval.

(Measurement of Visible Light Transmittance and Infrared Transmittance)

By using the above spectrophotometer (U-4000, an integrating sphere was used, manufactured by Hitachi Ltd.), the light transmittances of the infrared shielding films 4-1 to 4-11 were measured in the region of 300 nm to 2000 nm. The transmittance at 350 nm was used as a visible light transmittance, and the transmittance at 1200 nm was used as infrared transmittance.

(Evaluation of Durability)

The infrared shielding films 4-1 to 4-11 were kept at a high temperature and high humidity condition at 40° C., 80% for 4 hours, after that, they were transferred to an environment of 20° C., 50% over 2 hours, further kept for 4 hour in the same state, and brought back to the state of 40° C., 80% over 2 hours. A single cycle consists of those whole processes and a durability test against changes in a temperature and humidity was performed for 6 cycles in total. After that, the visible light transmittance and infrared transmittance were obtained as described above.

Each infrared shielding film sample after the above durability test against changes in a temperature and humidity was subjected to 30 times of a bending test according to the method of flexibility test based on JIS K5600-5-1 using a flexibility testing apparatus Type 1 (IMC-AOF2, diameter of mandrel: φ 20 mm, manufactured by Imoto Machinery Co., Ltd., The surface of the infrared shielding film was then observed with naked eyes, and the coating film strength was evaluated according to the following criteria.

Evaluation Criteria

⊚: Creases or cracks are not observed on the surface of the infrared shielding film ○: Slight creases are observed on the surface of the infrared shielding film Δ: Some tiny cracks are observed on the surface of the infrared shielding film X: Many apparent cracks occurred on the surface of the infrared shielding film The measurement result and evaluation result obtained from the above tests are listed in Table 11.

TABLE 11

| infrared shielding film number | Coating liquid number (thermally decomposable resin) | Metal oxide particles | Resin type | Coiling temperature (° C.) | Binder | Retractive index | Coating liquid index | Metal oxide particles | High refractive index layer Resin type | Refractive index | Film formation Coating method | Heating treatment (pore formation) | Visible light transmittance (%) | Infrared transmittance (%) | Durability |
|---|---|---|---|---|---|---|---|---|---|---|---|---|---|---|---|
| 4-1 | 4-3 | Colloidal silica | Poly-γ-butyrolactam | 76 | Acid-treated gelatin | 1.31 | 4-1(=2-6) | Titanium oxide | VP-1 | 1.89 | Successive coating | After lamination | 84 | 10 | ○ |
| 4-2 | 4-3 | Colloidal silica | Poly-γ-butyrolactam | 76 | Acid-treated gelatin | 1.31 | 4-1(=2-6) | Titanium oxide | | | | | | | |
| 4-3 | 4-3 | Colloidal silica | Poly-γ-butyrolactam | 76 | Acid-treated gelatin | 1.31 | 4-2(=1-12) | Titanium oxide | | | | | | | |
| 4-4 | 4-3 | Colloidal silica | Poly-γ-butyrolactam | 76 | Acid-treated gelatin | 1.31 | 4-2(=1-12) | Titanium oxide | | | | | | | |
| 4-5 | 4-5 | Colloidal silica | Poly-γ-butyrolactam | 76 | PVA235 | 1.33 | 4-3 | Titanium oxide | | | | | | | |
| 4-6 | 4-5 | Colloidal silica | Poly-γ-butyrolactam | 76 | PVA235 | 1.32 | 4-3 | Titanium oxide | | | | | | | |
| 4-7 | 4-4 | Hollow silica | Poly-γ-butyrolactam | 76 | Acid-treated gelatin | 1.21 | 4-3 | Titanium oxide | | | | | | | |
| 4-8 | 4-4 | Hollow silica | Poly-γ-butyrolactam | 76 | Acid-treated gelatin | 1.21 | 4-3 | Titanium oxide | | | | | | | |
| 4-9 | 4-6 | Colloidal silica | Poly-trichloroacetaldehyde | 18 | Acid-treated gelatin | 1.30 | 4-3 | Titanium oxide | | | | | | | |
| 4-10 | 4-7 | Hollow silica | Poly-trichloroacetaldehyde | 18 | Acid-treated gelatin | 1.20 | 4-3 | Titanium oxide | | | | | | | |
| 4-11 | 4-8 | Hollow silica | Poly-γ-butyrolactam | 18 | Acid-treated gelatin + guar gum | 1.20 | 4-3 | Titanium oxide | | | | | | | |

TABLE 11-continued

| | | | | | | | |
|---|---|---|---|---|---|---|---|
| 4-2 | VP-1 | 1.89 | Simultaneous multilayer coating | After lamination | 84 | 7 | ⊚ |
| 4-3 | HVW105 | 1.89 | Successive coating | After lamination | 85 | 11 | ○ |
| 4-4 | HVW105 | 1.89 | Simultaneous multilayer coating | After lamination | 86 | 6 | ⊚ |
| 4-5 | PVA217:HPVA1 = 7/3 | 1.89 | Successive coating | After lamination | 84 | 9 | ○ |
| 4-6 | PVA217:HPVA1 = 7/3 | 1.89 | Simultaneous multilayer coating | After lamination | 86 | 5 | ⊚ |
| 4-7 | PVA217:HPVA1 = 7/3 | 1.89 | Successive coating | After lamination | 89 | 2 | ○ |
| 4-8 | PVA217:HPVA1 = 7/3 | 1.89 | Simultaneous multilayer coating | After lamination | 89 | 3 | ⊚ |
| 4-9 | PVA217:HPVA1 = 7/3 | 1.89 | Simultaneous multilayer coating | After lamination | 85 | 9 | ⊚ |
| 4-10 | PVA217:HPVA1 = 7/3 | 1.89 | Simultaneous multilayer coating | After lamination | 89 | 1 | ⊚ |
| 4-11 | PVA217:HPVA1 = 7/3 | 1.89 | Simultaneous multilayer coating | After lamination | 90 | 1 | ⊚ |

As it is clearly listed in Table 11, the infrared shielding film produced by the production method of the present invention has excellent durability in addition to excellent infrared shielding property and visible light transmitting property.

Example 4-2

Production of Infrared Shielding Body

[Production of Infrared Shielding Bodies 4-1 to 4-11]

Infrared shielding bodies 4-1 to 4-11 were produced by pasting each of the infrared shielding films 4-1 to 4-11 that have been produced in Example 4-1 on a transparent acrylate resin plate having a thickness of 5 mm and a size of 20 cm×20 cm by adhering each with acryl adhesives.

<<Evaluation of Infrared Shield Body>>

The infrared shielding bodies 4-1 to 4-11 of the present invention as produced above were easily usable, even though the infrared shielding bodies have a large size. In addition, excellent infrared reflecting property was confirmed by using the infrared shielding film of the present invention.

The present application is based on Japanese Patent Application No. 2011-113260 filed on May 20, 2011, Japanese Patent Application No. 2011-113261 filed on May 20, 2011, and Japanese Patent Application No. 2011-124437 filed on Jun. 2, 2011, and the contents of their disclosures are incorporated herein by reference in their entirety.

The invention claimed is:

1. An infrared shielding film comprising on a substrate at least one unit having:
   a low refractive index layer that contains first metal oxide particles and a first binder; and
   a high refractive index layer that is adjacent to the low refractive index layer, contains second metal oxide particles and a second binder, and has a higher refractive index than the low refractive index layer,
   wherein at least one layer of the low refractive index layer and the high refractive index layer contains, as a binder, at least one of the following (a) to (c):

(a) a carboxyvinyl polymer that contains a monomer component, which contains a carboxylic acid, in an amount of 20 to 75% by mass of an entire composition of the carboxyvinyl polymer;
   (b) a copolymer having pH dependency of viscosity; and
   (c) a modified polyvinyl alcohol which is a copolymer obtained by copolymerization of (1) a polyvinyl alcohol having an average polymerization degree of 200 to 2400 and (2) at least one type of polymerizable vinyl monomer selected from the group consisting of an unsaturated carboxylic acid, a salt of the unsaturated carboxylic acid, and an ester of the unsaturated carboxylic acid.

2. The infrared shielding film according to claim 1, wherein the at least one layer of the low refractive index layer and the high refractive index layer contains (c) the modified polyvinyl alcohol.

3. The infrared shielding film according to claim 2, wherein (1) the polyvinyl alcohol having the average polymerization degree of 200 to 2400 and (2) the at least one type of polymerizable vinyl are copolymerized at mass ratio of 0.5:9.5 to 9.5:0.5.

4. The infrared shielding film according to claim 3, wherein the polymerizable vinyl monomer is at least one type of monomer selected from the group consisting of acrylic acid, methacrylic acid, fumaric acid, maleic acid, itaconic acid, and a salt thereof, and an unsaturated carboxylic acid ester represented by the following formula (I):

$$CH_2=C(R_1)-COOR_2 \quad (I)$$

wherein $R_1$ represents a hydrogen atom or a methyl group and $R_2$ represents an alkyl group with 1 to 4 carbon atoms.

5. The infrared shielding film according to claim 4, wherein the polymerizable vinyl monomer is a mixture of acrylic acid or a salt thereof and methyl methacrylate, and the mass ratio of acrylic acid or a salt thereof to methyl methacrylate is 3:7 to 0.5:9.5 (acrylic acid or a salt thereof: methyl methacrylate).

6. The infrared shielding film according to claim 2, wherein a content of the modified polyvinyl alcohol is 5 to 45% by mass with respect to the total binder amount of a layer containing the modified polyvinyl alcohol.

7. The infrared shielding film according to claim 1, wherein the at least one layer of the low refractive index layer and the high refractive index layer contains (a) the carboxyvinyl polymer that contains a monomer component, which contains a carboxylic acid, in an amount of 20 to 75% by mass of the entire composition.

8. The infrared shielding film according to claim 7, wherein a content of the carboxyvinyl polymer is 0.2 to 5.0% by mass with respect to the total binder amount of a layer containing the carboxyvinyl polymer.

9. The infrared shielding film according to claim 1, wherein the at least one layer of the low refractive index layer and the high refractive index layer contains (b) the copolymer having pH dependency of viscosity.

10. The infrared shielding film according to claim 9, wherein the copolymer having pH dependency of viscosity is a copolymer consisting of at least a monomer having vinyl amide and a monomer having vinyl carboxylic acid.

11. The infrared shielding film according to claim 10, wherein the vinyl amide is at least one monomer selected from vinyl pyrrolidone, vinyl caprolactam, N-vinyl formamide, N-vinyl acetamide, N-vinyl-N-methylacetamide, and a mixture thereof.

12. The infrared shielding film according to claim 10, wherein the vinyl carboxylic acid is at least one monomer selected from (metha)acrylic acid, crotonic acid, itaconic acid, maleic acid, and a mixture thereof.

13. The infrared shielding film according to claim 9, wherein the copolymer having pH dependency of viscosity is a copolymer which is polymerized using a cross linking agent having at least two polymerizable free radical groups in the molecule.

14. The infrared shielding film according to claim 13, wherein the cross linking agent is at least one compound selected from pentaerythritol triallyl ether, pentaerythritol triacrylate, pentaerythritol tetraacrylate, and methylene bisacrylamide.

15. The infrared shielding film according to claim 9, wherein a content of the copolymer having pH dependency of viscosity is 0.2 to 4.0% by mass with respect to the total binder amount of a layer containing the copolymer.

16. The infrared shielding film according to claim 1, wherein the low refractive index layer has pores.

17. The infrared shielding film according to claim 1, wherein (c) the modified polyvinyl alcohol is at least one of non-ion modified polyvinyl alcohol and anion modified polyvinyl alcohol.

18. The infrared shielding film according to claim 1, wherein a transmittance of the visible light is 50% or more and a reflectance is 50% or more at a wavelength of 900 to 1,400 nm.

19. An infrared shielding film comprising on a substrate at least one unit having:
- a low refractive index layer that contains first metal oxide particles and a first binder; and
- a high refractive index layer that is adjacent to the low refractive index layer, contains second metal oxide particles and a second binder, and has a higher refractive index than the low refractive index layer,
- in which at least one layer of the low refractive index layer and the high refractive index layer contains, as a binder, at least one of ethylene modified polyvinyl alcohol, a carboxylic acid modified polyvinyl alcohol, diacetone modified polyvinyl alcohol, and thiol modified polyvinyl alcohol.

* * * * *